(12) United States Patent
Zhao et al.

(10) Patent No.: US 11,312,224 B2
(45) Date of Patent: Apr. 26, 2022

(54) DUAL ROW PLANETARY HYBRID COUPLING MECHANISM AND MOTOR VEHICLE

(71) Applicant: Guangzhou Automobile Group Co., Ltd., Guangdong (CN)

(72) Inventors: Jiangling Zhao, Guangdong (CN); Weili Wu, Guangdong (CN); Jiyu Lin, Guangdong (CN); Dongdong Li, Guangdong (CN); Chuan Wang, Guangdong (CN); Yang Yang, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 79 days.

(21) Appl. No.: 16/334,365

(22) PCT Filed: Oct. 23, 2018

(86) PCT No.: PCT/CN2018/111502
§ 371 (c)(1),
(2) Date: Mar. 19, 2019

(87) PCT Pub. No.: WO2019/119961
PCT Pub. Date: Jun. 27, 2019

(65) Prior Publication Data
US 2021/0354544 A1    Nov. 18, 2021

(30) Foreign Application Priority Data

Dec. 20, 2017 (CN) .......................... 201711388141.5

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/445* (2013.01); *B60K 6/547* (2013.01)

(58) Field of Classification Search
CPC ........ B60K 6/365; B60K 6/387; B60K 6/445; B60K 6/547; F16H 2200/2023; F16H 2200/2025; F16H 2200/2028
See application file for complete search history.

(56) References Cited

U.S. PATENT DOCUMENTS

2007/0105678 A1* 5/2007 Bucknor ................. F16H 3/728
475/5
2019/0270371 A1* 9/2019 Scholle .................. B60K 6/547

FOREIGN PATENT DOCUMENTS

CN          101149094 A     3/2008
CN          101323242 A     12/2008
(Continued)

*Primary Examiner* — Tisha D Lewis
(74) *Attorney, Agent, or Firm* — ScienBiziP, P.C.

(57) ABSTRACT

Some embodiments of the present disclosure provide a dual row planetary hybrid coupling mechanism and a motor vehicle. The dual row planetary hybrid coupling mechanism includes a fuel driven mechanism, a single row planetary gear mechanism, a dual clutch, an intermediate connecting shaft structure, a compound planetary gear mechanism, a first electric driving mechanism, a second electric driving mechanism and a power output mechanism, wherein the fuel driven mechanism, the first electric driving mechanism and the second electric driving mechanism are connected for output by the single row planetary gear mechanism and the compound planetary gear mechanism, and finally, power output is carried out by the power output mechanism.

10 Claims, 17 Drawing Sheets

(51) Int. Cl.
*B60K 6/445* (2007.10)
*B60K 6/547* (2007.10)

(56) References Cited

FOREIGN PATENT DOCUMENTS

| | | | | |
|---|---|---|---|---|
| CN | 102271948 | A | | 12/2011 |
| CN | 102651586 | A | | 8/2012 |
| CN | 102874092 | A | | 1/2013 |
| CN | 103291860 | A | | 9/2013 |
| CN | 103978883 | A | | 8/2014 |
| CN | 204296444 | U | | 4/2015 |
| CN | 205706149 | U | | 11/2016 |
| CN | 106476603 | A | * | 3/2017 |
| CN | 106476610 | A | * | 3/2017 |
| CN | 106627096 | A | | 5/2017 |
| CN | 106864245 | A | | 6/2017 |
| CN | 107264262 | A | * | 10/2017 ............ B60K 6/365 |
| CN | 206579468 | U | | 10/2017 |
| CN | 108116217 | A | | 6/2018 |
| DE | 102015223256 | A1 | | 6/2017 |
| EP | 2536583 | A1 | | 12/2012 |
| JP | 2003034155 | A | | 2/2003 |
| JP | 2004284550 | A | | 10/2004 |
| JP | 2005337409 | A | | 12/2005 |
| JP | 2007308104 | A | | 11/2007 |
| WO | 2013000830 | A1 | | 1/2013 |

\* cited by examiner

DUAL ROW PLANETARY HYBRID COUPLING MECHANISM AND MOTOR VEHICLE

TECHNICAL FIELD

The present disclosure relates to a technical field of hybrid vehicles, and more particularly to a dual row planetary hybrid coupling mechanism and a motor vehicle.

BACKGROUND

A power system includes an engine (internal combustion engine) and a transmission system consisting of a transmission, a differential mechanism and a transmission shaft. Its function is to provide a driving power required for a driving wheel for a vehicle. The internal combustion engine has a certain speed and torque range, and achieves the best working state in a small range, which is either the least fuel consumption or the lowest harmful emissions, or both. However, the actual road conditions are ever-changing, not only in a speed of the driving wheel, but also in a torque required by the driving wheel. Therefore, good matching of an optimal speed and torque of the internal combustion engine, that is, an optimal power state, and a driving wheel power state is the primary task of the transmission.

At present, the transmissions on the market mainly include two types of transmission namely step-variable transmissions and continuously variable transmissions. The step-variable transmissions are subdivided into manual and automatic transmissions. Most of them provide a limited number of discrete input-output speed ratios through different meshing arrangements of a gear train or a planetary gear train. The adjustment of the driving wheel speed between two adjacent speed ratios is achieved by a speed change of the internal combustion engine. The continuously variable transmissions, whether mechanical, hydraulic, or machine-electric, can provide an infinite number of continuously selectable speed ratios within a certain speed range. Theoretically, the speed change of the driving wheel can be fully completed through the transmission. In this way, the internal combustion engine can work as much as possible within the optimum speed range. Moreover, compared to the step-variable transmission, the continuously variable transmission has better speed adjustment and can fully utilize the advantages of the maximum power of the internal combustion engine. Therefore, the continuously variable transmission has been an object of research by engineers all over the world for many years.

In recent years, the birth of a motor hybrid technology has opened up a new way to achieve complete power matching between the internal combustion engine and a power wheel. Among many power assembly designs, the representative ones are series hybrid systems and parallel hybrid systems. In the motor series hybrid system, the internal combustion engine—generator—motor—shaft system—driving wheel constitutes a series power chain, and the power assembly structure is extremely simple. The generator-motor combination can be regarded as a transmission in the traditional sense. For the motor parallel system, it has two parallel independent power chains, one consists of a traditional mechanical transmission, the other consists of a motor-battery system, the mechanical transmission is responsible for speed adjustment, and the motor-battery system adjusts the power or torque, and in order to give full play to the potential of the entire system, the mechanical transmission needs to adopt the continuously variable transmission mode, and the structure is more complicated. In the parallel hybrid system, only part of the power passes through the motor system, so the power requirements for the motor are relatively low, and the overall system efficiency is high. However, this system requires two separate subsystems, which are expensive and usually only used in weak hybrid systems. The advantages of the series hybrid system are that a structure is simple and a layout is flexible. However, since all power passes through the generator and the motor, the power requirement of the motor is high, the volume is large, and the weight is heavy. Moreover, the efficiency of the entire system is low because the energy transfer process is subjected to mechanical-electrical transformation and electrical-mechanical transformation for two times.

SUMMARY

In view of this, in order to solve the above problem, some embodiments of the present disclosure provide a dual row planetary hybrid coupling mechanism and a motor vehicle, various power driving modes and output speed ratios are provided according to actual conditions, the overall system efficiency is high, the structure can also be simplified, and requirements for a motor are reduced.

The technical solutions are as follows:

A dual row planetary hybrid coupling mechanism includes a fuel driven mechanism, a single row planetary gear mechanism, a dual clutch, an intermediate connecting shaft structure, a compound planetary gear mechanism, a first electric driving mechanism, a second electric driving mechanism and a power output mechanism;

the fuel driven mechanism includes an engine, and a first input shaft connected to the engine;

the single row planetary gear mechanism includes a first sun gear fixedly arranged, a first planetary carrier provided on the first input shaft, a first planetary gear provided on the first planetary carrier and meshing with the first sun gear, and a first gear ring meshing with the first planetary gear, and the dual clutch corresponds to the first gear ring and the first input shaft respectively;

the intermediate connecting shaft structure includes an intermediate input shaft connected to the dual clutch, and a first brake corresponding to the intermediate input shaft;

the first electric driving mechanism includes a generator, a second input shaft connected to the generator, and a second brake corresponding to the second input shaft, and the second electric driving mechanism includes a driving motor, and a third input shaft connected to the driving motor;

the intermediate input shaft, the second input shaft and the third input shaft are connected to the compound planetary gear mechanism, and the compound planetary gear mechanism is connected to the power output mechanism.

The dual row planetary hybrid coupling mechanism includes one engine, two motors, one single row planetary gear mechanism, one compound planetary gear mechanism, a shaft gear system and the like. The two motors and the engine are connected by the two planetary-line gear mechanisms. The system can effectively supplement the driving power required by a power wheel through the two motors, thereby more rationally adjusting the engine power and keeping the engine working not or less affected by road conditions, so that the engine can always work at the set optimal state to improve efficiency of the entire system and greatly improve fuel efficiency of the entire system. Moreover, the engine and the generator are connected by the two planetary-line gear mechanisms, a speed ratio is adjustable, a speed ratio range is large, and a volume of the generator can be reduced; and in a hybrid mode, the speed can be adjusted by the two planetary-line gear mechanisms, a working range of the engine is optimized, and the economic performance of the engine is improved; moreover, the driving motor is connected for output through the planetary-line gear mechanisms, which can increase the speed ratio of the driving motor, and facilitate the high speed of the motor, thereby reducing a size of the motor, and facilitating space saving and weight reduction.

The technical solutions are further described as follows:

In an exemplary embodiment, the compound, planetary gear mechanism includes a second planetary carrier connected to the intermediate input shaft, a second sun gear connected to the second input shaft, a third sun gear connected to the third input shaft, a second planetary gear and a third planetary gear provided on the second planetary carrier, and a second gear ring meshing with the third planetary gear;

the second electric driving mechanism further includes a third brake corresponding to the third input shaft, the second planetary gear meshes with the second sun gear, the third planetary gear meshes with the third sun gear, the second planetary gear meshes with the third planetary gear, and the second gear ring is connected to the power output mechanism.

In an exemplary embodiment, the compound planetary gear mechanism includes a second planetary carrier connected to the intermediate input shaft, a second sun gear connected to the second input shaft, a third sun gear connected to the third input shaft, a second planetary gear provided on the second planetary carrier and meshing with the second sun gear, a third planetary gear fixedly arranged and meshing with the third sun gear, and a second gear ring simultaneously meshing with the second planetary gear and the third planetary gear, the second gear ring being connected to the power output mechanism.

In an exemplary embodiment, the dual row planetary hybrid coupling mechanism has a pure electric driving mode, and in the pure electric driving mode, the first brake locks the intermediate input shaft;

when the driving motor drives the compound planetary gear mechanism through the third input shaft, a single-motor electric driving mode is achieved, and when the driving motor drives the compound planetary gear mechanism through the third input shaft and the generator drives the compound planetary gear mechanism through the second input shaft, a dual-motor pure electric driving mode is achieved.

In an exemplary embodiment, the dual row planetary hybrid coupling mechanism has an engine direct driving mode, and in the engine direct driving mode, the second brake locks the second input shaft:

when the first input shaft meshes with the dual clutch, the first input shaft directly drives the compound planetary gear mechanism through the intermediate input shaft, and when the first gear ring meshes with the dual clutch, the single row planetary gear mechanism drives the compound planetary gear mechanism through the intermediate input shaft.

In an exemplary embodiment, the dual row planetary hybrid coupling mechanism has an engine direct driving mode, and in the engine direct driving mode, the third brake locks the third input shaft;

when the first input shaft meshes with the dual clutch, the first input shaft directly drives the compound planetary gear mechanism through the intermediate input shaft, and when the first gear ring meshes with the dual clutch, the single row planetary gear mechanism drives the compound planetary gear mechanism through the intermediate input shaft.

In an exemplary embodiment, the dual row planetary hybrid coupling mechanism has a hybrid driving mode, in the hybrid driving mode:

the engine drives the compound planetary gear mechanism through the first input shaft or the single row planetary gear mechanism, and the driving motor drives the compound planetary gear mechanism through the third input shaft.

In an exemplary embodiment, the dual row planetary hybrid coupling mechanism further includes a power battery connected to the generator and the driving motor, wherein the dual row planetary hybrid coupling mechanism automatically achieves switching of various driving modes according to a State of Charge (SOC) value of the power battery and a required output speed value.

In an exemplary embodiment, a process of the dual row planetary hybrid coupling mechanism switches a driving mode is as follows:

A magnitude relationship between the SOC value of the power battery and a first threshold is determined, or a magnitude relationship between the SOC value of the power battery and a first threshold and a magnitude relationship between the required output speed value and a second threshold are simultaneously determined;

a driving mode of the dual row planetary hybrid coupling mechanism is switched according to a determination result.

In addition, some embodiments of the present disclosure also provide a motor vehicle, including the dual row planetary hybrid coupling mechanism described above.

Some embodiments of the present disclosure have the following outstanding advantages:

1. An engine and a generator are connected by a planetary gear mechanism, the speed ratio is adjustable, a range of the speed ratio is large, and a rotate speed of the generator is higher than a rotate speed of the engine, so that the torque demand of the generator is reduced, and the volume of the generator can be reduced.

2. In a hybrid mode, the speed can be adjusted by the planetary gear mechanism, the working range of the engine is optimized, and the economic performance of the engine is improved.

3. A driving motor is connected for output through the planetary gear mechanism, which can increase the speed ratio of the driving motor, and facilitate the high speed of the motor, thereby reducing the size of the motor, and facilitating space saving and weight reduction.

4. During the mode switching process, the driving motor participates in the drive, and there is no power interruption.

5. Two pure electric driving modes, two hybrid driving modes and two (or four) engine direct driving modes can be achieved, thereby realizing many system modes and good economy.

Figure 1:
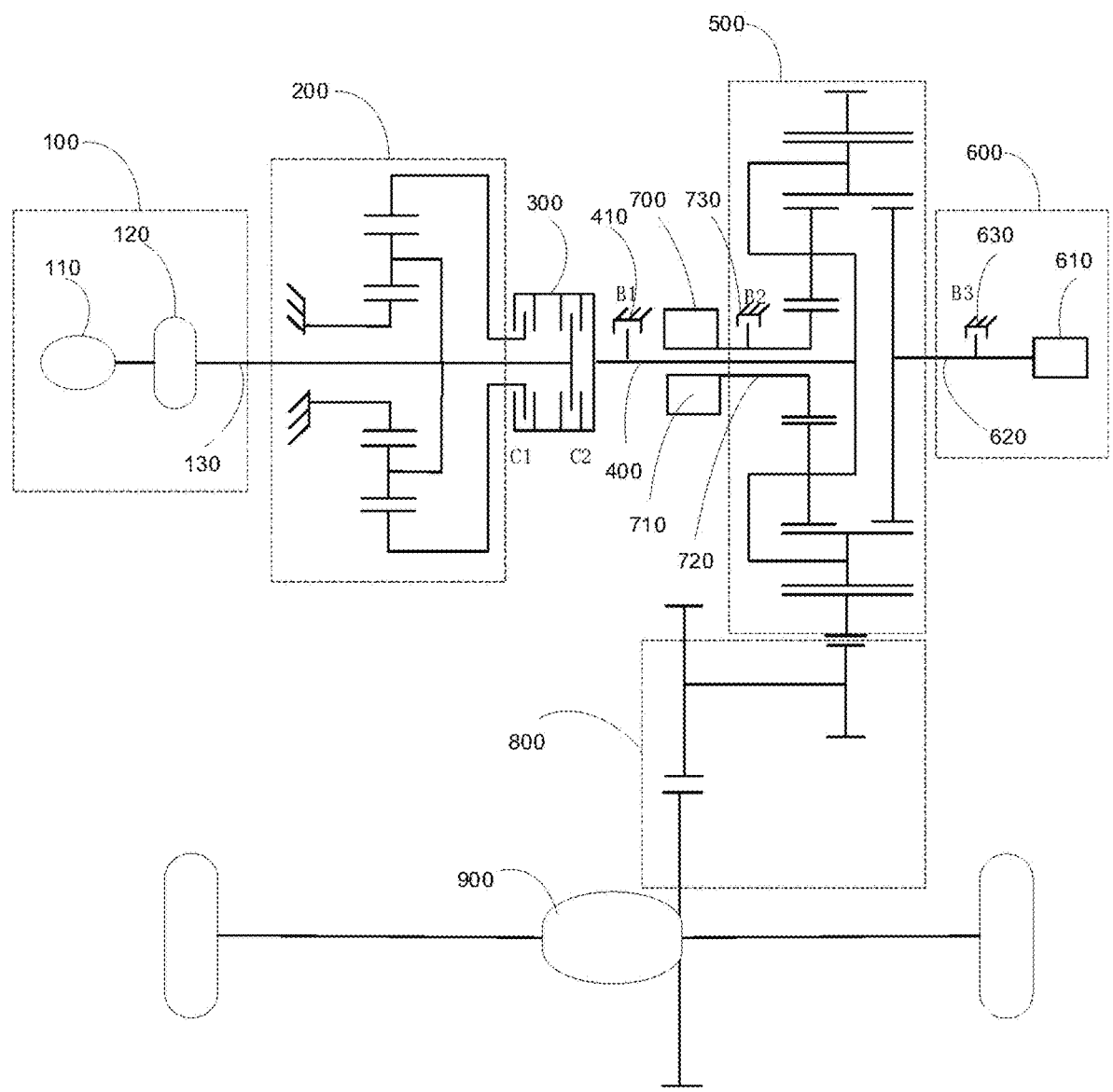
FIG. 1 is a structure block diagram of a dual row planetary hybrid coupling mechanism according to a first embodiment of the present disclosure.

DESCRIPTION OF THE REFERENCE SIGNS 100, fuel driven mechanism; 110, engine; 120, torsional damper; 130, first input shaft; 200, single row planetary gear mechanism; 210, first sun gear; 220, first planetary gear; 230, first planetary carrier; 240, first gear ring; 300, dual clutch; 400, intermediate input shaft; 410, first brake; 500, compound planetary gear mechanism; 510, second planetary carrier; 520, second sun gear; 530, second planetary gear; 540, third sun gear; 550, third planetary gear; 560, second gear ring; 600, second electric driving mechanism; 610, driving motor; 620, third input shaft; 630, third brake; 700, first electric driving mechanism; 710, generator; 720, second input shaft; 730, second brake; 800, power output gear mechanism; 810, first transmission gear; 820, first transmission shaft; 830, second transmission gear; 840, third transmission gear; 900, differential mechanism.

DETAILED DESCRIPTION OF THE EMBODIMENTS

Embodiments of the present disclosure are described in detail below, and the examples of the embodiments are illustrated in the accompanying drawings, where the same reference numerals in the respective drawings denote the same parts. The embodiments described below with reference to the drawings are intended to be illustrative of the present disclosure and are not to be construed as limiting the present disclosure.

First Embodiment

As shown in FIG. 1, an embodiment of the present, disclosure provides a dual row planetary hybrid coupling mechanism, which includes a fuel driven mechanism 100, a single row planetary gear mechanism 200, a dual clutch 300, an intermediate connecting shaft structure, a compound planetary gear mechanism 500, a first electric driving mechanism 700, a second electric driving mechanism 600 and a power output mechanism. By means of the single row planetary gear mechanism 200, the dual clutch 300, the intermediate connecting shaft structure and the compound planetary gear mechanism 500, the fuel driven mechanism 100, the first electric driving mechanism 700 and the second electric driving mechanism 600 can be dynamically coupled, power is output by the power output mechanism, multiple power driving modes can be achieved, and efficiency and economy of an entire system can be improved.

Figure 2:
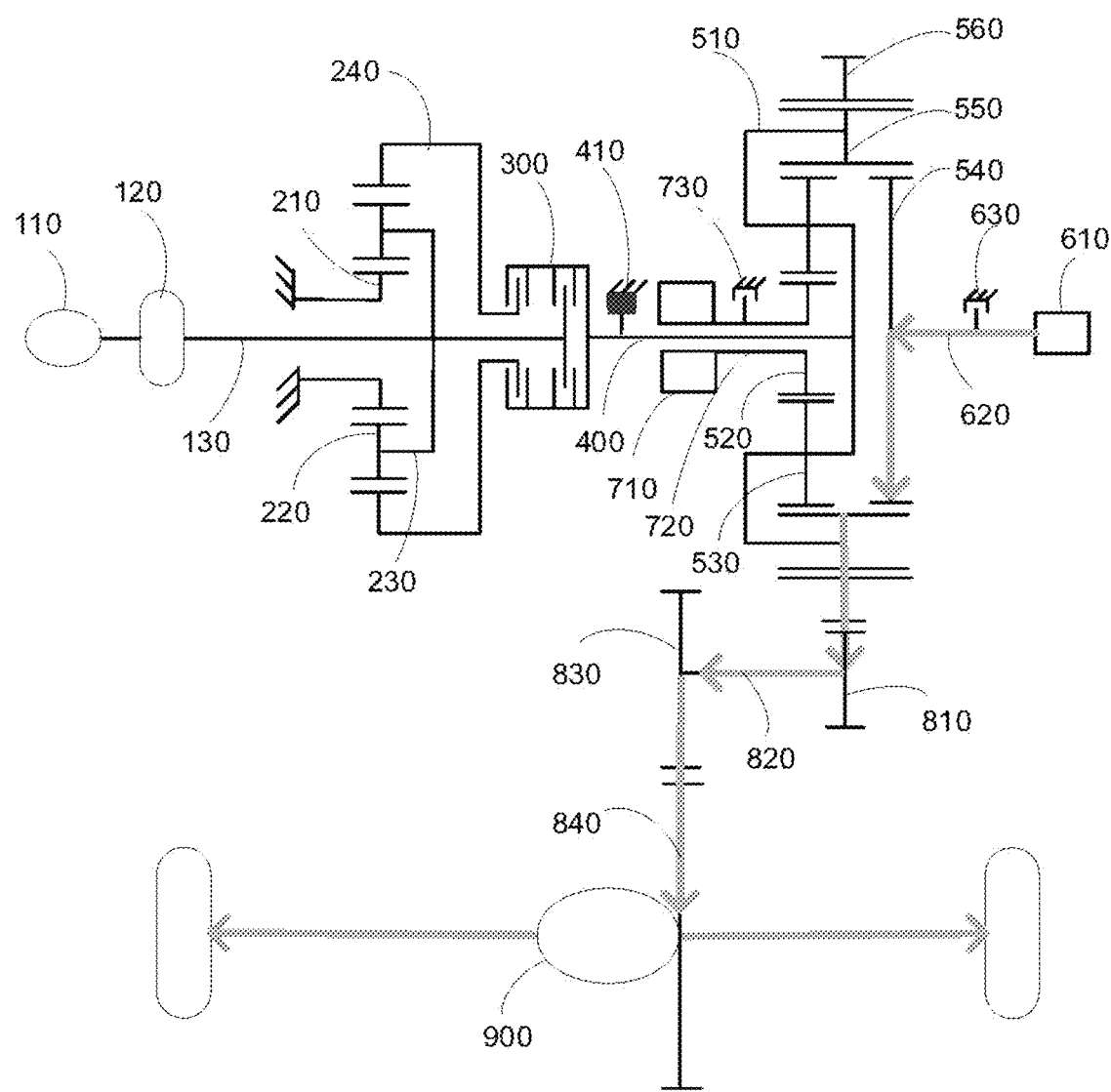
FIG. 2 is a structure block diagram of a dual row planetary hybrid coupling mechanism in a single-motor pure electric mode according to a first embodiment of the present disclosure.

Specifically, as shown in FIG. 2, the fuel driven mechanism 100 includes an engine 110, a torsional damper 120 connected to the engine 110, and a first input shaft 130 connected to the torsional damper 120. The torsional damper 120 may dampen power output by the engine 110, so that the first input shaft 130 smoothly outputs the power. In addition, the single row planetary gear mechanism 200 includes a first sun gear 210 (non-rotatable) fixedly provided, a first planetary carrier 230 provided on the first input shaft 130, a first planetary gear 220 provided on the first planetary carrier 230 and meshing with the first sun gear 210, and a first gear ring 240 meshing with the first planetary gear 220. The dual clutch 300 corresponds to the first gear ring 240 and the first input shaft 130 respectively. That is, the dual clutch 300 may mesh with the first input shaft 130 or may mesh with the first gear ring 240. Moreover, the intermediate connecting shaft structure includes an intermediate input shaft 400 connected to the dual clutch 300, and a first brake 410 corresponding to the intermediate input shaft 400, and the intermediate input shaft 400 is connected to the compound planetary gear mechanism 500. When the dual clutch 300 meshes with the first input shaft 130, the engine 110 may directly drive the compound planetary gear mechanism 500 through the first input shaft 130 and the intermediate input shaft 400. When the dual clutch 300 meshes with the first gear ring 240, the first input shaft 130 drives the single row planetary gear mechanism 200 (the first planetary carrier 230, thereby driving the first planetary gear 220 and the first gear ring 240) and the intermediate input shaft 400, so as to drive the compound planetary gear mechanism 500.

Moreover, the first electric driving mechanism 700 includes a generator 710, a second input shaft 720 connected to the generator 710, and a second brake 730 corresponding to the second input shaft 720, and the second electric driving mechanism 600 includes a driving motor 610, and a third input shaft 620 connected to the driving motor 610. Moreover, the second input shaft 720 and the third input shaft 620 are both connected to the compound planetary gear mechanism 500, and the compound planetary gear mechanism 500 is connected to the power output mechanism. The generator 710 may drive the compound planetary gear mechanism 500 through the second input shaft 720, and power is output by the power output mechanism. The driving motor 610 may drive the compound planetary gear mechanism 500 through the third input shaft 620, and power is output by the power output mechanism. Moreover, the generator 710 and the driving motor 610 may simultaneously drive the compound planetary gear mechanism 500.

Moreover, in an exemplary embodiment, the compound planetary gear mechanism 500 includes a second planetary carrier 510 connected to the intermediate input shaft 400, a second sun gear 520 connected to the second input shaft 720, a third sun gear 540 connected to the third input shaft 620, a second planetary gear 530 and a third planetary gear 550 provided on the second planetary carrier 510, and a second gear ring 560 meshing with the third planetary gear 550. In an exemplary embodiment, the second electric driving mechanism 600 includes a third brake 630 corresponding to the third input shaft 620, the second planetary gear 530 meshes with the second sun gear 520, the third planetary gear 550 meshes with the third sun gear 540, the second planetary gear 530 meshes with the third planetary gear 550, and the second gear ring 560 is connected to the power output mechanism. The engine 110 may drive the second planetary carrier 510, the second planetary gear 530 and the third planetary gear 550 through the intermediate input shaft 400 so as to drive the second gear ring 560 to drive the power output mechanism to realize power output of the engine. The driving motor 610 drives the third sun gear 540 and the third planetary gear 550 through the third input shaft 620, so as to drive the second gear ring 560, thereby driving the power output mechanism to realize power output of the driving motor. The generator 710 drives the second sun gear 520, the second planetary gear 530 and the third planetary gear 550 through the second input shaft 720, so as to drive the second gear ring 560 to drive the power output mechanism to realize power output of the generator. In an exemplary embodiment, the compound planetary gear mechanism may be set as a Lavina planetary gear mechanism.

The dual row planetary hybrid coupling mechanism includes one engine, two motors, one single row planetary gear mechanism, one compound planetary gear mechanism, a shaft gear system and the like. Two motors (i.e., the generator 710 and the driving motor 610) and the engine 110 are connected by two planetary-line gear mechanisms (i.e., the single row planetary gear mechanism 200 and the compound planetary gear mechanism 500). The driving power required by a power wheel can be effectively supplemented through the two motors, thereby more rationally adjusting the power of the engine 110 and keeping a working state of the engine 110 not or less affected by road conditions, so that the engine 110 can always work at a set optimal state to improve efficiency of the entire system and greatly improve fuel efficiency of the entire system. Moreover, the engine 110 and the generator 710 are connected by the two planetary-line gear mechanisms, the speed ratio is adjustable, the speed ratio range is larger, and the volume of the generator 710 can be reduced; and in a hybrid mode, the speed can be adjusted by the two planetary-line gear mechanisms, a working range of the engine 110 is optimized, and an economic performance of the generator 710 is improved; moreover, the driving motor 610 is connected for output through the planetary-line gear mechanism (i.e., the compound planetary gear mechanism 500), which can increase a speed ratio of the driving motor 610, and facilitate a high speed of the motor, thereby reducing a size of the motor, and facilitating space saving and weight reduction.

Figure 3:
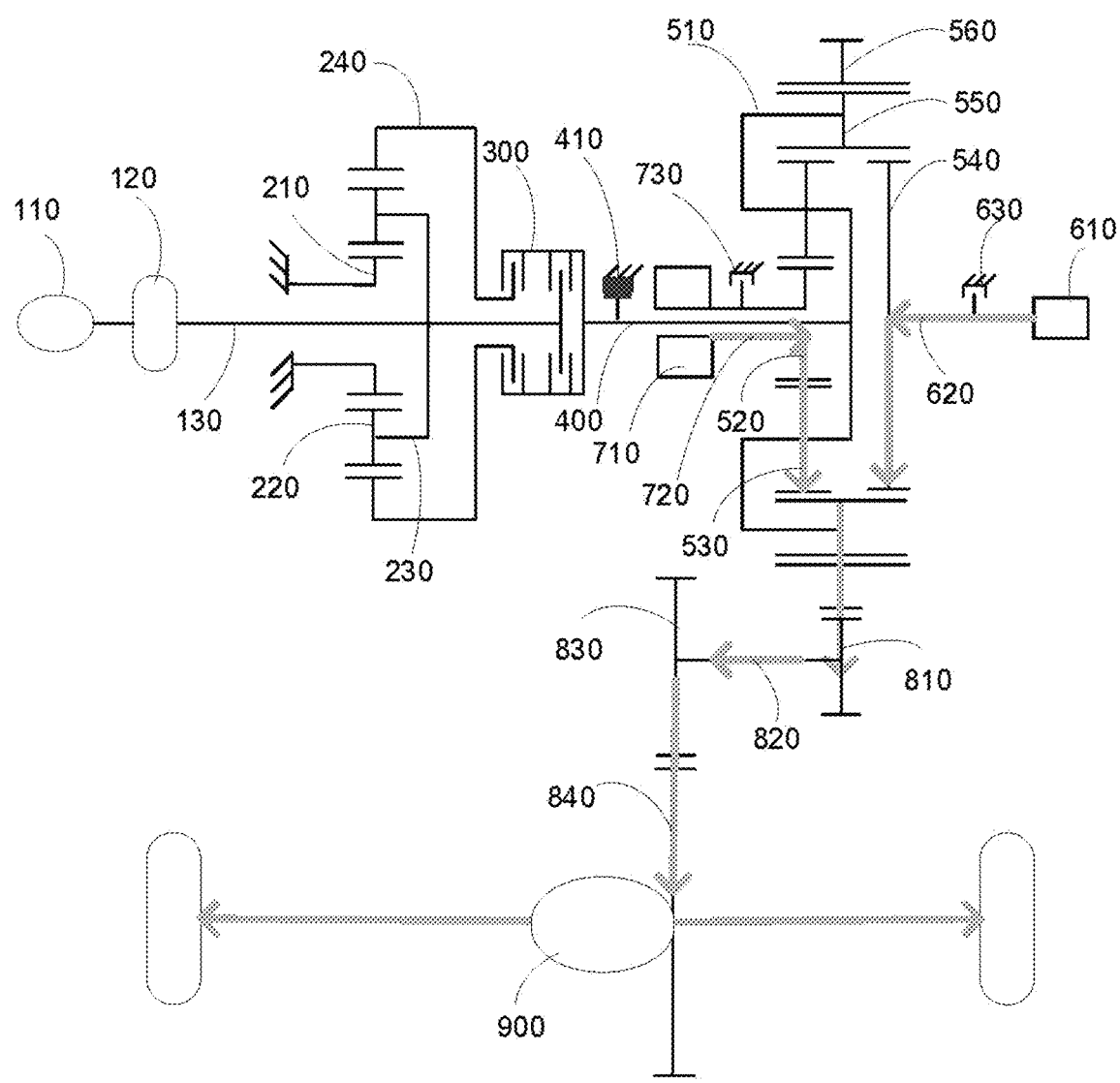
FIG. 3 is a structure block diagram of a dual row planetary hybrid coupling mechanism in a dual-motor pure electric mode according to a first embodiment of the present disclosure.

In addition, as shown in FIG. 2 to FIG. 3, the dual row planetary hybrid coupling mechanism has a pure electric driving mode, in the pure electric driving mode, the first brake 410 locks the intermediate input shaft 400, so that the intermediate input shaft 400 cannot rotate, and the second planetary carrier 510 cannot rotate accordingly. At this time, the power of the engine 110 cannot be transferred by the intermediate input shaft 400, and the compound planetary gear mechanism 500 is only driven, by the driving motor 610 and the generator 710, thereby realizing pure electric power output.

Moreover, as shown in FIG. 2, when only the driving motor 610 works, the driving motor 610 drives the compound planetary gear mechanism 500 through the third input shaft 620, and the dual row planetary hybrid coupling mechanism achieves a single-motor electric driving mode. At this time, the third input shaft 620 drives the third sun gear 540 to rotate, so as to drive the third planetary gear 550 to revolve on its own axis to drive the second gear ring 560, thereby driving the power output mechanism by the second gear ring 560, so as to achieve the single-motor pure electric driving mode. In an exemplary embodiment, as shown in FIG. 3, when the driving motor 610 and the generator 710 simultaneously work, the driving motor 610 drives the compound planetary gear mechanism 500 through the third input shaft 620, and the generator 710 drives the compound planetary gear mechanism 500 through the second input shaft 720, so as to achieve a dual-motor pure electric driving mode. At this time, not only the third input shaft 620 drives the third sun gear 540 to rotate, but also the second input shaft 720 also drives the second sun gear 520 to rotate, so as to drive the second planetary gear 530 to revolve on its own axis, so that the third sun gear 540 and the second planetary gear 530 are enabled to simultaneously drive the third planetary gear 550 to rotate on its own axis, so as to drive the second gear ring 560, thereby driving the power output mechanism by the second gear ring 560, so as to achieve the dual-motor pure electric driving mode. By switching the single-motor pure electric driving mode and the dual-motor pure electric driving mode, the speed ratio under pure electric driving can be adjusted.

Figure 4:
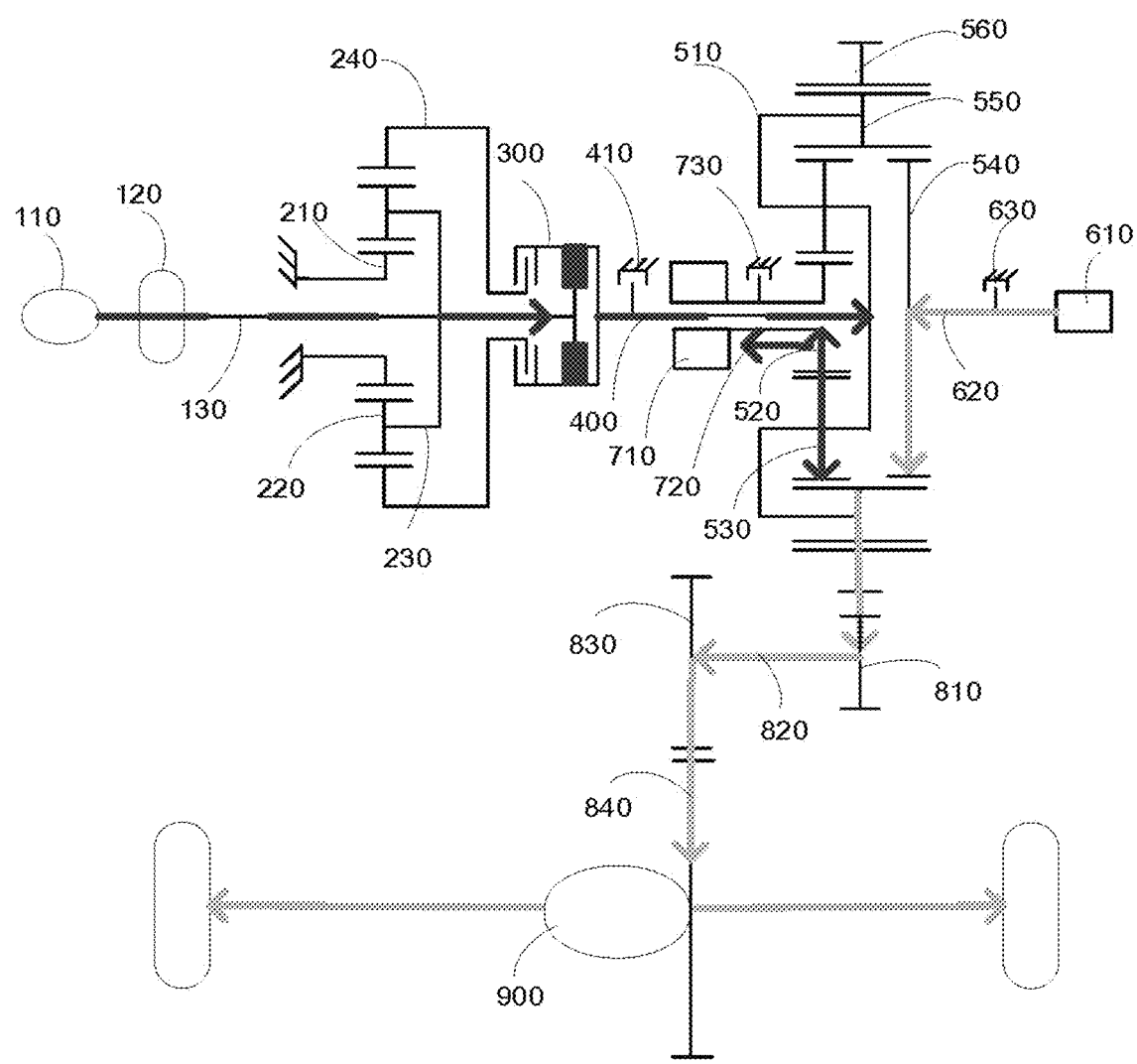
FIG. 4 is a structure block diagram of a dual row planetary hybrid coupling mechanism in a first hybrid driving mode according to a first embodiment of the present disclosure.
Figure 5:
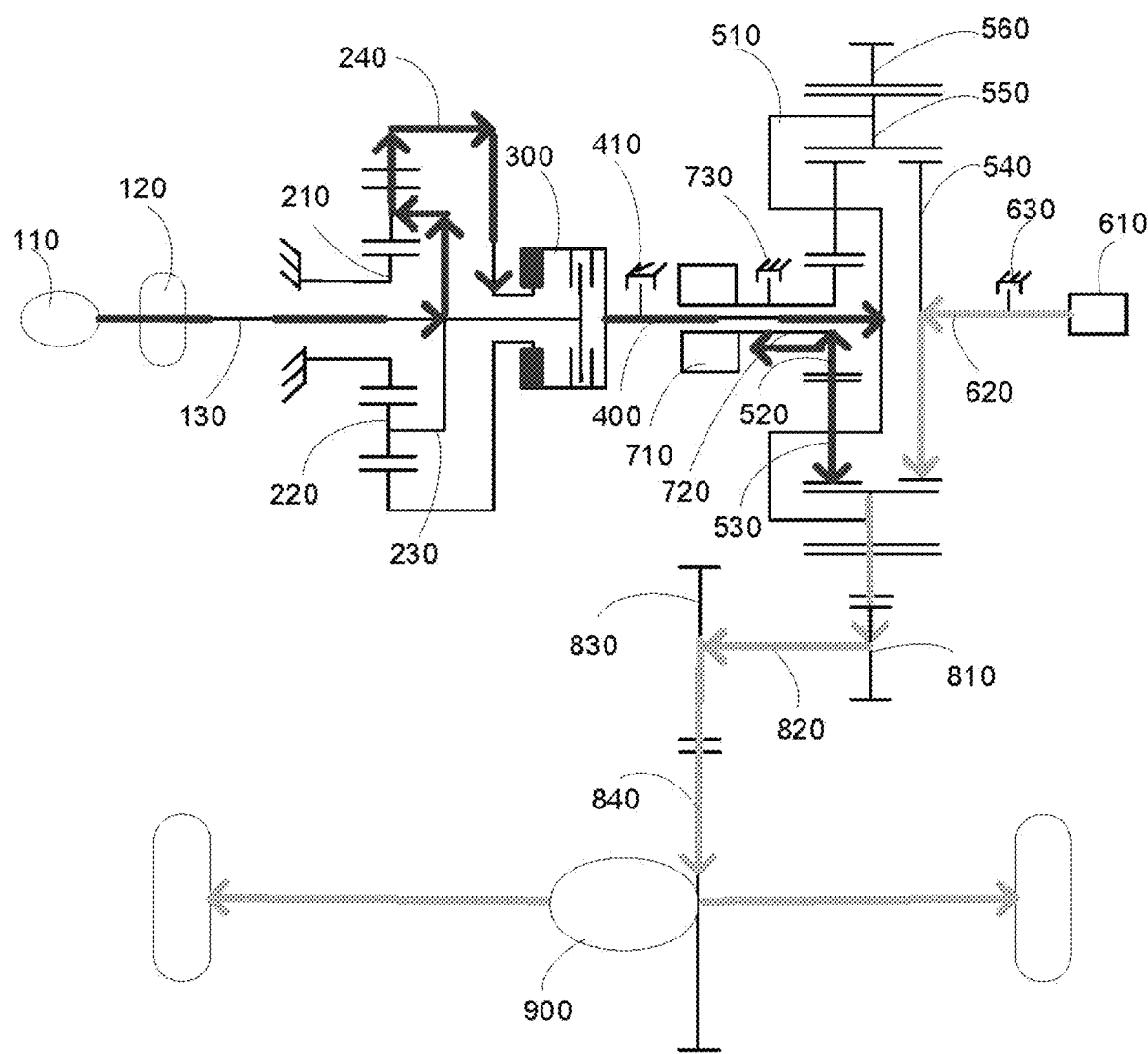
FIG. 5 is a structure block diagram of a dual row planetary hybrid coupling mechanism in a second hybrid driving mode according to a first embodiment of the present disclosure.

In addition, as shown in FIG. 4 to FIG. 5, the dual row planetary hybrid coupling mechanism has a hybrid driving mode, that is, the engine 110 and the driving motor 610 simultaneously perform a driving mode. In the hybrid driving mode, the engine 110 may drive the compound planetary gear mechanism 500, and the driving motor 610 may also drive the compound planetary gear mechanism 500. Specifically, as shown in FIG. 4, the dual clutch 300 meshes with the first input shaft 130, so that the first input shaft 130 is directly connected to the intermediate input shaft 400 through the dual clutch 300, the engine 110 can directly drive the second planetary carrier 510 of the compound planetary gear mechanism 500 through the first input shaft 130 to rotate, so as to drive the second planetary gear 530 and the third planetary gear 550 to rotate, thereby driving the second gear ring 560 to perform engine drive on the power output mechanism. Moreover, the driving motor 610 drives the third sun gear 540 through the third input shaft 620, the third sun gear 540 also drives the third planetary gear 550 to rotate, and the third planetary gear 550 also drives the second gear ring 560 to rotate, so that the power output mechanism can be electrically driven. In this way, both the engine drive and the electric drive of the power output mechanism can be achieved simultaneously, i.e., hybrid drive of the dual row planetary hybrid coupling mechanism is achieved. In addition, as shown in FIG. 5, the dual clutch 300 meshes with the first gear ring 240, so that, the first input shaft 130 performs rotation drive on the first planetary carrier 230, the first planetary carrier 230 drives the first planetary gear 220 to rotate around the first sun gear 210, the first planetary carrier 230 drives the first gear ring 240, and the first gear ring 240 drives the intermediate input shaft 400 to rotate through the dual clutch 300. Thus, the engine 110 can drive the second planetary carrier 510 of the compound planetary gear mechanism 500 through the single row planetary gear mechanism 200 to rotate, so as to drive the second planetary gear 530 and the third planetary gear 550 to rotate, thereby driving the second gear ring 560 to perform engine drive on the power output mechanism. Moreover, the driving motor 610 drives the third sun gear 540 through the third input shaft 620, the third sun gear 540 also drives the third planetary gear 550 to rotate, and the third planetary gear 550 also drives the second gear ring 560 to rotate, so that the power output mechanism can be electrically driven. In this way, both the engine drive and the electric drive of the power output mechanism can be achieved simultaneously, i.e., hybrid drive of the dual row planetary hybrid coupling mechanism is achieved. That is, the engine 110 uses the first input shaft 130 or the single row planetary gear mechanism 200 to drive the compound planetary gear mechanism 500 by the dual clutch 300, the driving motor 610 drives the compound planetary gear mechanism 500 through the third input shaft 620 to achieve hybrid driving, and an output speed ratio can be adjusted by the dual clutch 300.

Moreover, in the hybrid driving mode, the generator 710 may be used to start the engine 110. In addition, in the hybrid driving mode, the second planetary gear 530 will be driven by the second planetary carrier 510 to rotate, so as to drive the second sun gear 520 to rotate, which in turn drives the second input shaft 720 to rotate, so that the generator 710 can perform power generation. Moreover, it is also possible to store the generated electric energy for use or for transmission to the driving motor 610 for use.

In an exemplary embodiment, as shown in FIG. 6 to FIG. 9, the dual row planetary hybrid coupling mechanism has an engine direct driving mode, that is, only the engine is used to drive the power output mechanism, the generator 710 and the driving motor 610 do not output power, and the generator 710 may be used to start the engine 110. In the engine direct driving mode, the third brake 630 locks the third input shaft 620, or the second brake 730 locks the second input shaft 720, so that the third sun gear 540 is fixed and immovable or the second sun gear 520 is fixed and immovable.

Figure 6:
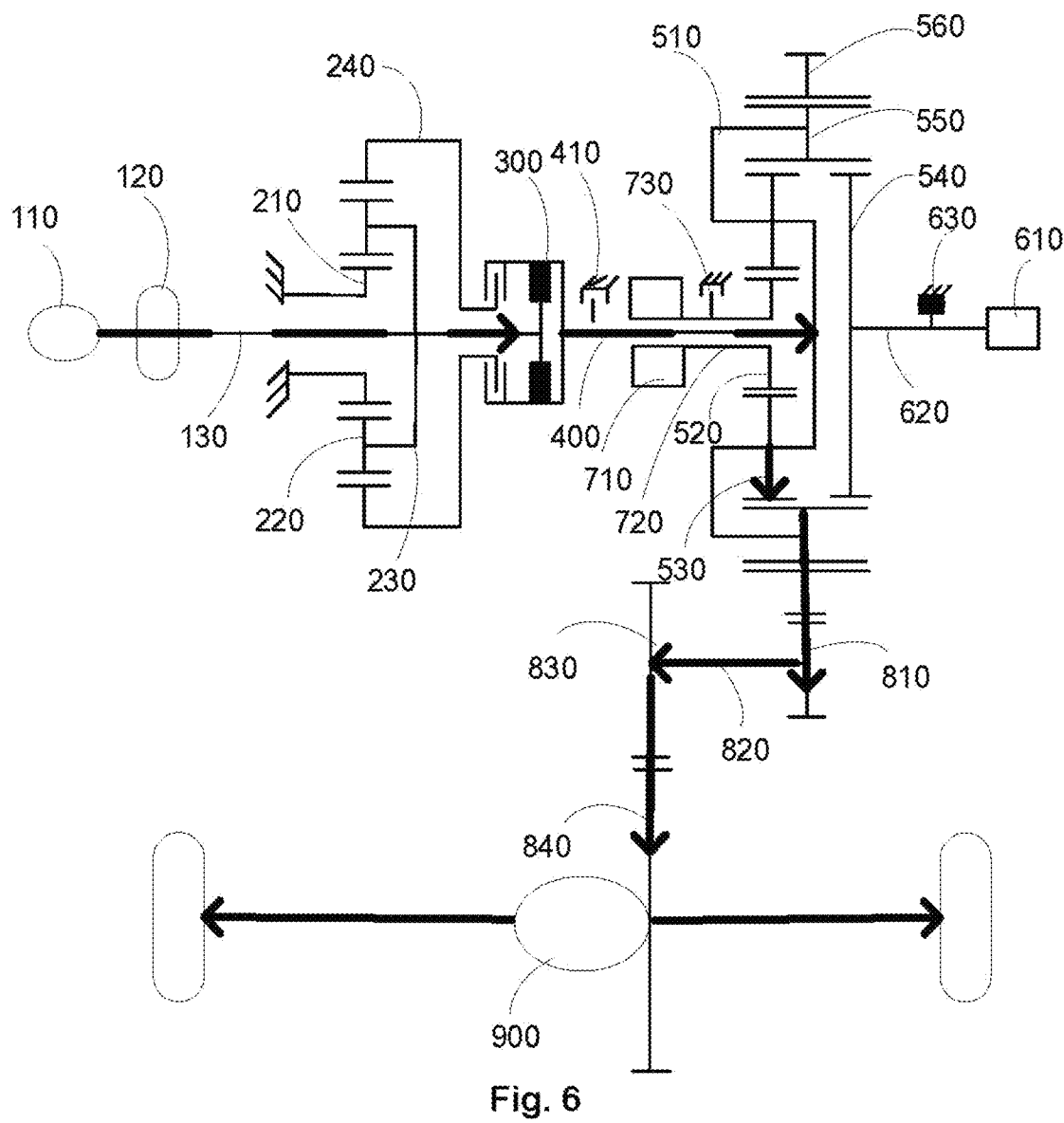
FIG. 6 is a structure block diagram of a dual row planetary hybrid coupling mechanism in an engine direct driving mode (first gear) according to a first embodiment of the present disclosure.
Figure 7:
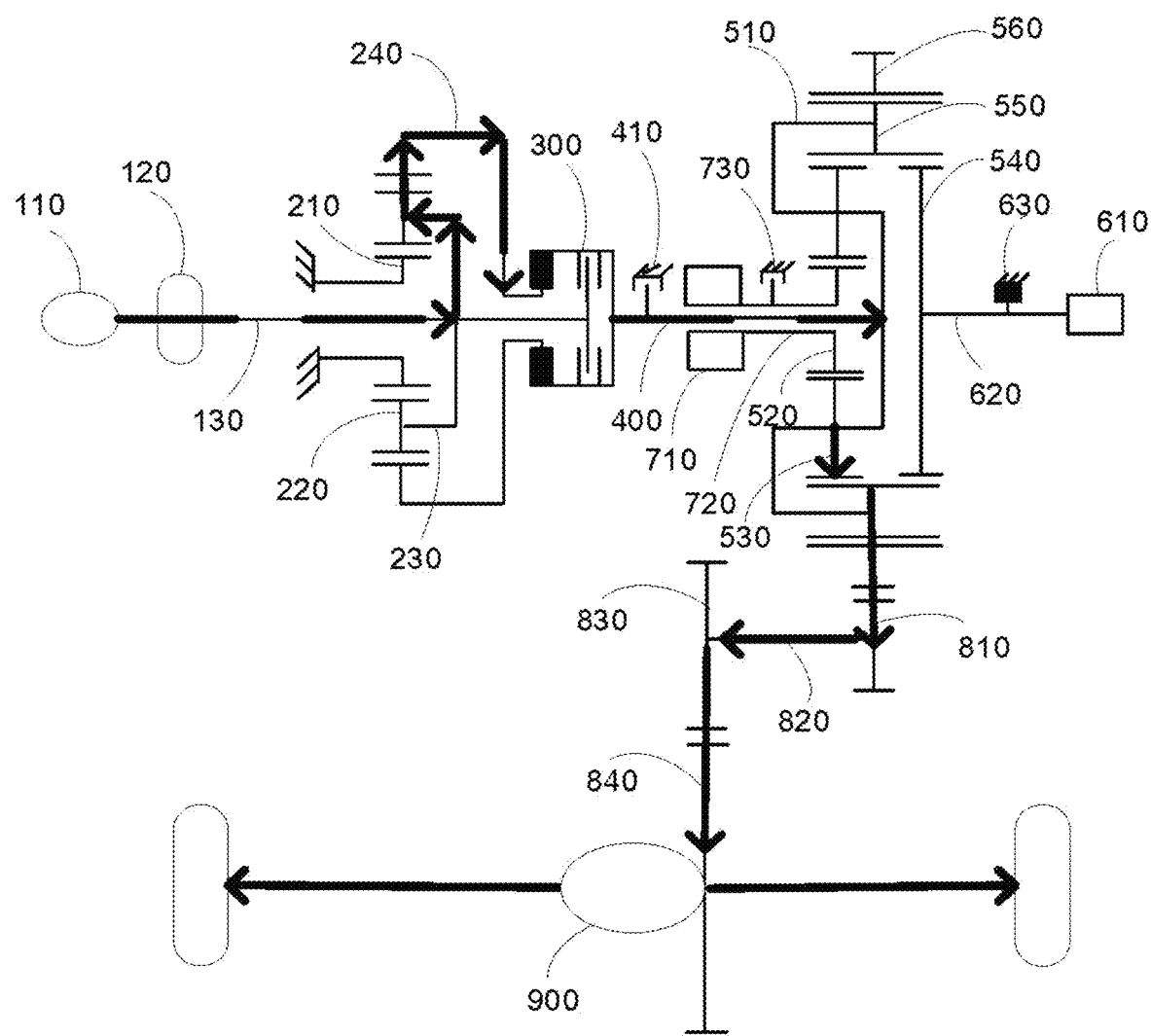
FIG. 7 is a structure block diagram of a dual row planetary hybrid coupling mechanism in an engine direct driving mode (second gear) according to a first embodiment of the present disclosure.

Moreover, as shown in FIG. 6 to FIG. 7, the third brake 630 locks the third input shaft 620, and when the first input shaft 130 meshes with the dual clutch 300, the first input shaft 130 directly drives the compound planetary gear mechanism 500 through the intermediate input shaft 400. At this time, a first-gear direct driving mode of the engine 110 can be achieved. Specifically, the dual clutch 300 meshes with the first input shaft 130, so that the first input shaft 130 is directly connected to the intermediate input shaft 400 through the dual clutch 300, and the engine 110 can directly drive the second planetary carrier 510 of the compound planetary gear mechanism 500 through the first input shaft 130 to rotate to drive the third planetary gear 550 (around the third sun gear 540) to rotate, thereby driving the second gear ring 560 to perform engine drive on the power output mechanism. When the first gear ring 240 meshes with the dual clutch 300, the single row planetary gear mechanism 200 drives the compound planetary gear mechanism 500 through the intermediate input shaft 400. At this time, a second-gear direct driving mode of the engine 110 can be achieved. Specifically, the dual clutch 300 meshes with the first gear ring 240, so that the first input shaft 130 performs rotation drive on the first planetary carrier 230, the first planetary carrier 230 drives the first planetary gear 220 to rotate around the first sun gear 210, the first planetary carrier 230 drives the first gear ring 240, and the first gear ring 240 drives the intermediate input shaft 400 to rotate through the dual clutch 300. Thus, the engine 110 can drive the second planetary carrier 510 of the compound planetary gear mechanism 500 through the single row planetary gear mechanism 200 to rotate, so as to drive the third planetary gear 550 (around the third sun gear 540) to rotate, thereby driving the second gear ring 560 to perform engine drive on the power output mechanism.

Figure 8:
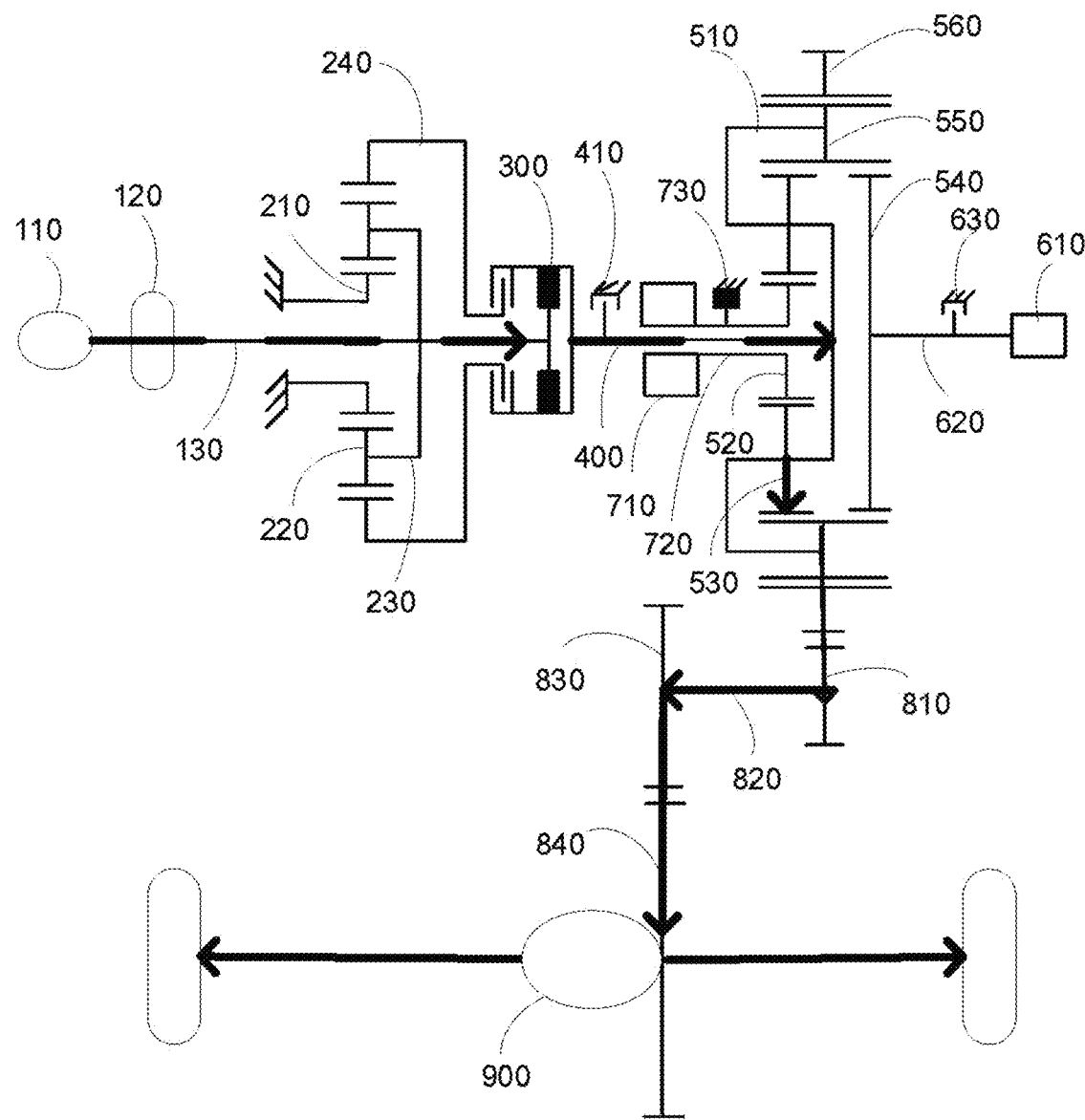
FIG. 8 is a structure block diagram of a dual row planetary hybrid coupling mechanism in an engine direct driving mode (third gear) according to a first embodiment of the present disclosure.
Figure 9:
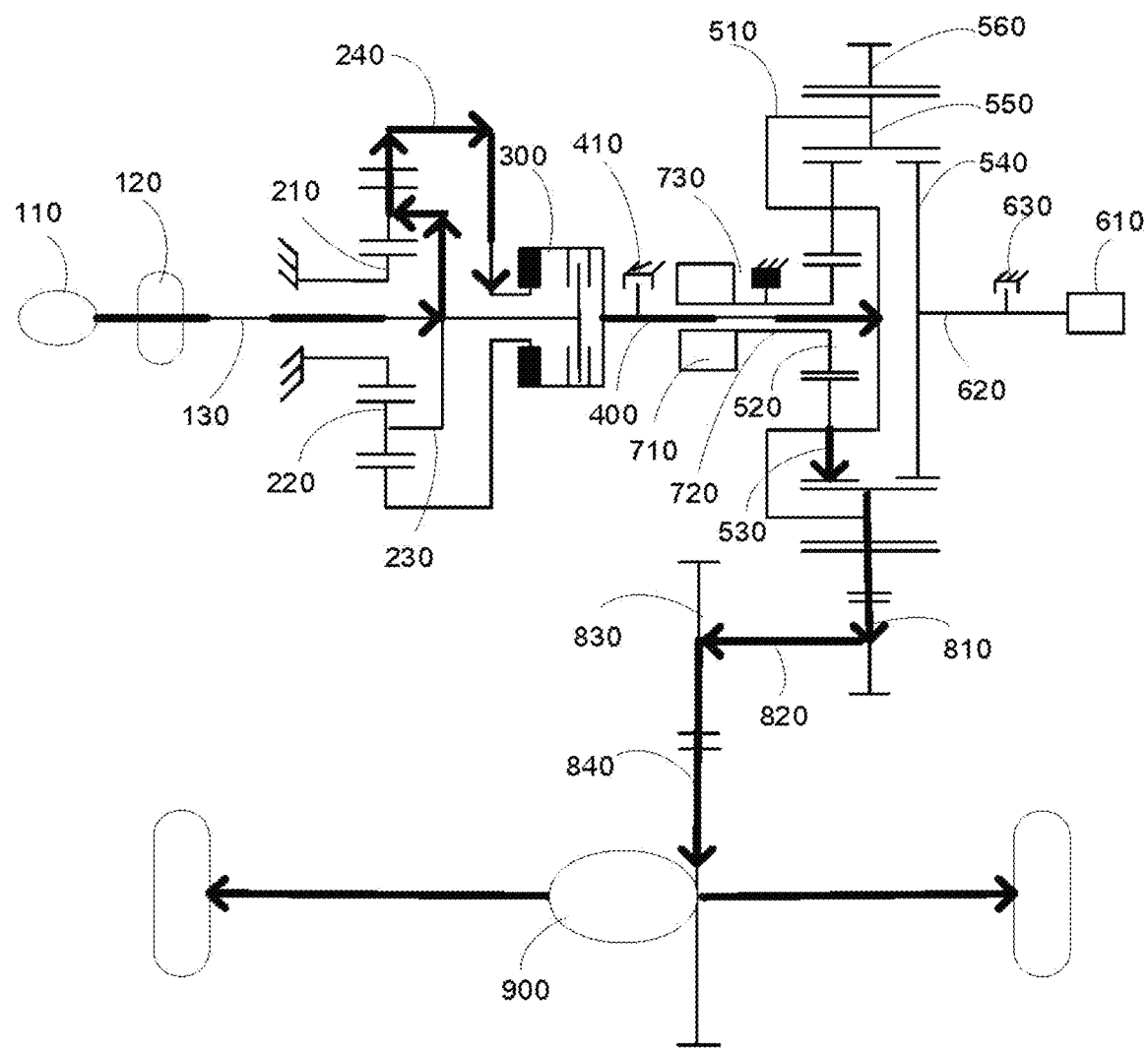
FIG. 9 is a structure block diagram of a dual row planetary hybrid coupling mechanism in an engine direct driving mode (fourth gear) according to a first embodiment of the present disclosure.

In an exemplary embodiment, as shown in FIG. 8 to FIG. 9, when the second brake 730 locks the second input shaft 720, and when the first input shaft 130 meshes with the dual clutch 300, the first input shaft 130 directly drives the compound planetary gear mechanism 500 through the intermediate input shaft 400. At this time, a third-gear direct driving mode of the engine 110 can be achieved. Specifically, the dual clutch 300 meshes with the first input shaft 130, so that the first input shaft 130 is directly connected to the intermediate input shaft 400 through the dual clutch 300, and the engine 110 can directly drive the second planetary carrier 510 of the compound planetary gear mechanism 500 through the first input shaft 130 to rotate, so as to drive the second planetary gear 530 (around the second sun gear 520) to rotate and drive the third planetary gear 550 to rotate, thereby driving the second gear ring 560 to perform engine drive on the power output mechanism. When the first gear ring 240 meshes with the dual clutch 300, the single row planetary gear mechanism 200 drives the compound planetary gear mechanism 500 through the intermediate input shaft 400. At this time, a fourth-gear direct driving mode of the engine 110 can be achieved. Specifically, the dual clutch 300 meshes with the first gear ring 240, so that the first input shaft 130 performs rotation drive on the first planetary carrier 230, the first planetary carrier 230 drives the first planetary gear 220 to rotate around the first sun gear 210, so that the first planetary carrier 230 drives the first gear ring 240, and the first gear ring 240 drives the intermediate input shaft 400 to rotate through the dual clutch 300. Thus, the engine 110 can drive the second planetary carrier 510 of the compound planetary gear mechanism 500 through the single row planetary gear mechanism 200 to rotate, so as to drive the second planetary gear 530 (around the second sun gear 520) to rotate and drive the third planetary gear 550 to rotate, thereby driving, the second gear ring 560 to perform engine drive on the power output mechanism. In this way, the four-gear speed ratio of the engine can be adjusted by the single row planetary gear mechanism 200 and the compound planetary gear mechanism 500, the system modes are diverse, the efficiency is high, and the economy is good.

In an exemplary embodiment, the dual row planetary hybrid coupling mechanism includes a power battery connected to the generator 710 and the driving motor 720, wherein the dual row planetary hybrid coupling mechanism may automatically achieve switching of various driving modes according to an SOC (State of Charge, also called battery remaining capacity) value of the power battery and a required output speed value. Further, the dual row planetary hybrid coupling mechanism switches a driving mode as follows:

At S100, a magnitude relationship between the SOC value of the power battery and a first threshold is determined, or a magnitude relationship between the SOC value of the power battery and a first threshold and a magnitude relationship between the required output speed value and a second threshold are simultaneously determined.

At S200, a driving mode of the dual row planetary hybrid coupling mechanism is switched according to a determination result, such as a pure electric driving mode, or a hybrid driving mode, or an engine direct driving mode.

Moreover, the first threshold is used to determine a level of the SOC value of the power battery, and the second threshold is used to determine a level of the required output speed value. In some embodiments, the range of the first threshold and the second threshold is not limited. Generally, it can be freely set according to a specific control strategy. Under different control strategies, the values of the first threshold and the second threshold are different. After the first threshold and the second threshold are set, automatic determination is performed, and automatic switching between three modes is performed according to the determination result.

In addition, when the brake is used for braking, the driving motor 610 generates a braking torque to brake a wheel, and at the same time, an induced current is generated in a motor winding to charge the battery, so that recovery of braking energy can be achieved. Therefore, in an exemplary embodiment, when the driving mode is switched, the following process is further included:

At S300, during braking, the driving motor is controlled to generate a braking torque and an induced current is generated in a winding to charge the power battery.

Figure 10:
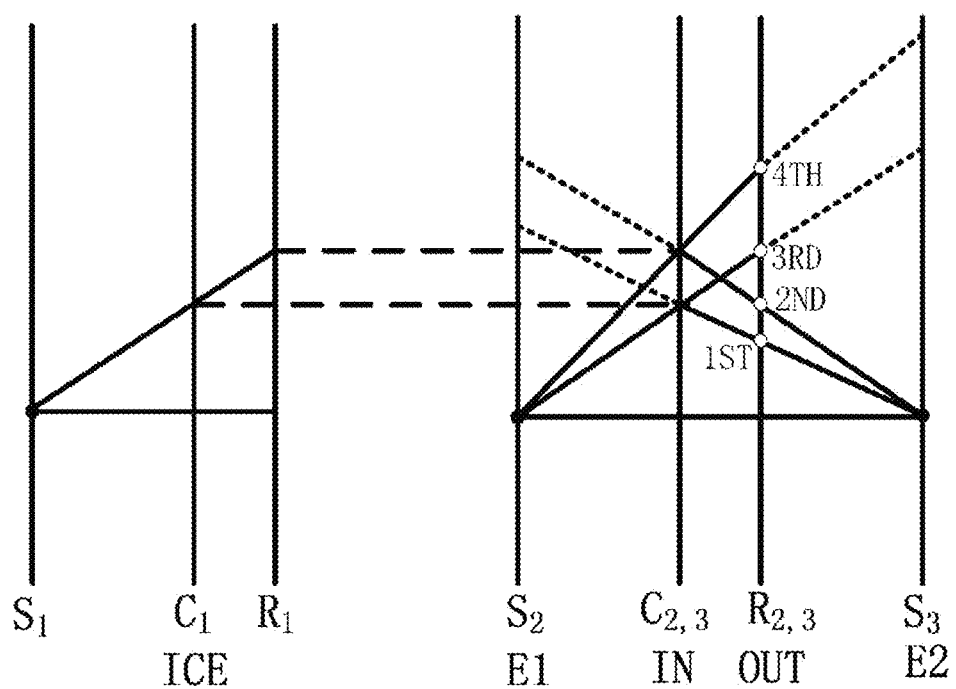
FIG. 10 is a lever diagram of a dual row planetary hybrid coupling mechanism according to a first embodiment of the present disclosure.

Moreover, as shown in FIG. 10, the above three types of power-coupled driving modes are as follows in Table 1 below:

TABLE 1

| Mode | Execution component | | | | | | | | Use condition | |
| --- | --- | --- | --- | --- | --- | --- | --- | --- | --- | --- |
| | Engine | Generator | Driving motor | C1 | C2 | B1 | B2 | B3 | SOC | Speed |
| Single-motor pure electric | / | / | Drive | | | ✓ | | | High | Full speed |
| Dual-motor pure electric | / | Drive | Drive | | | ✓ | | | High | Full speed |
| Hybrid driving mode 1 (E-CVT1) | Drive | Power generation, engine start | Auxiliary drive | ✓ | | | | | / | Medium-low speed |
| Hybrid driving mode 2 (E-CVT2) | Drive | Power generation, engine start | Auxiliary drive | | ✓ | | | | / | Medium-low speed |
| Engine direct drive (first gear) | Drive | Engine start | / | | ✓ | | | ✓ | / | Low speed |
| Engine direct drive (second gear) | Drive | Engine start | / | ✓ | | | | ✓ | / | Medium-low speed |
| Engine direct drive (third gear) | Drive | Engine start | / | | ✓ | | ✓ | | / | Medium-high speed |
| Engine direct drive (fourth gear) | Drive | Engine start | / | ✓ | | | ✓ | | / | High speed |

C1 indicates that the first input shaft 130 meshes with the dual clutch 300, and C2 indicates that the first gear ring 240 meshes with the dual clutch 300. B1 indicates the first brake 410, B2 indicates the second brake 730, and B3 indicates the third brake 630.

When the SOC value is high and the required output speed is a full speed, B1 can be braked to start the pure electric driving mode. Moreover, a single-motor pure electric driving mode may be started specifically, and the compound planetary gear mechanism 500 may be driven by the driving motor 610; in addition, a dual-motor pure electric driving mode may be started, the compound planetary gear mechanism 500 may be driven by the generator 710 and the driving motor 610 simultaneously.

When the required output speed is a medium-low speed, a hybrid driving mode (E-CVT) can be started. Moreover, by selecting C1 or C2, the hybrid driving mode 1 or the hybrid driving mode 2 can be achieved. In this case, the engine 110 is used as a main power to drive the compound planetary gear mechanism 500, and the drive motor 610 is used as an auxiliary power to drive the compound planetary gear mechanism 500. Moreover, in the process, the generator 710 can be used to start the engine 110, and the generator 710 can also be used to generate electricity.

In addition, when the required output speed is a low speed, a medium-low speed, a medium-high speed, or a high speed, an engine direct driving mode can also be started. Specifically, C1 or C2 can be selected and B3 or B2 can be selected for braking, first-gear direct drive, second-gear direct drive, third-gear direct drive or four-gear direct drive of the engine can be achieved. In this process, the generator 710 can be used to start the engine 110.

In addition, as shown in FIG. 1, the power output mechanism includes a power output gear mechanism 800 connected to the compound planetary gear mechanism 500, a differential mechanism 900 connected to the power output gear mechanism 800, and a power output shaft connected to the differential mechanism 900. In various driving modes, power is ultimately transmitted to the power output gear mechanism 800 of the power output mechanism through the compound planetary gear mechanism 500, the power output gear mechanism 800 transmits the power to the differential mechanism 900, and the power output shaft and a wheel (i.e., a power wheel) connected to the power output shaft are driven by the differential mechanism 900.

In an exemplary embodiment, the power output gear mechanism 800 may include a first transmission gear 810 meshing with the second gear ring 560 of the compound planetary gear mechanism 500, a first transmission shaft 820 connected to the first transmission gear 810, a second transmission, gear 830 connected to the first transmission shaft 820, and a third transmission gear 840 meshing with the second transmission gear 830, wherein the third transmission gear 840 can be connected to the differential mechanism 900 to transmit the power output from the compound planetary gear mechanism 500 to the differential mechanism 900 and the power output shaft.

Second Embodiment

Figure 11:
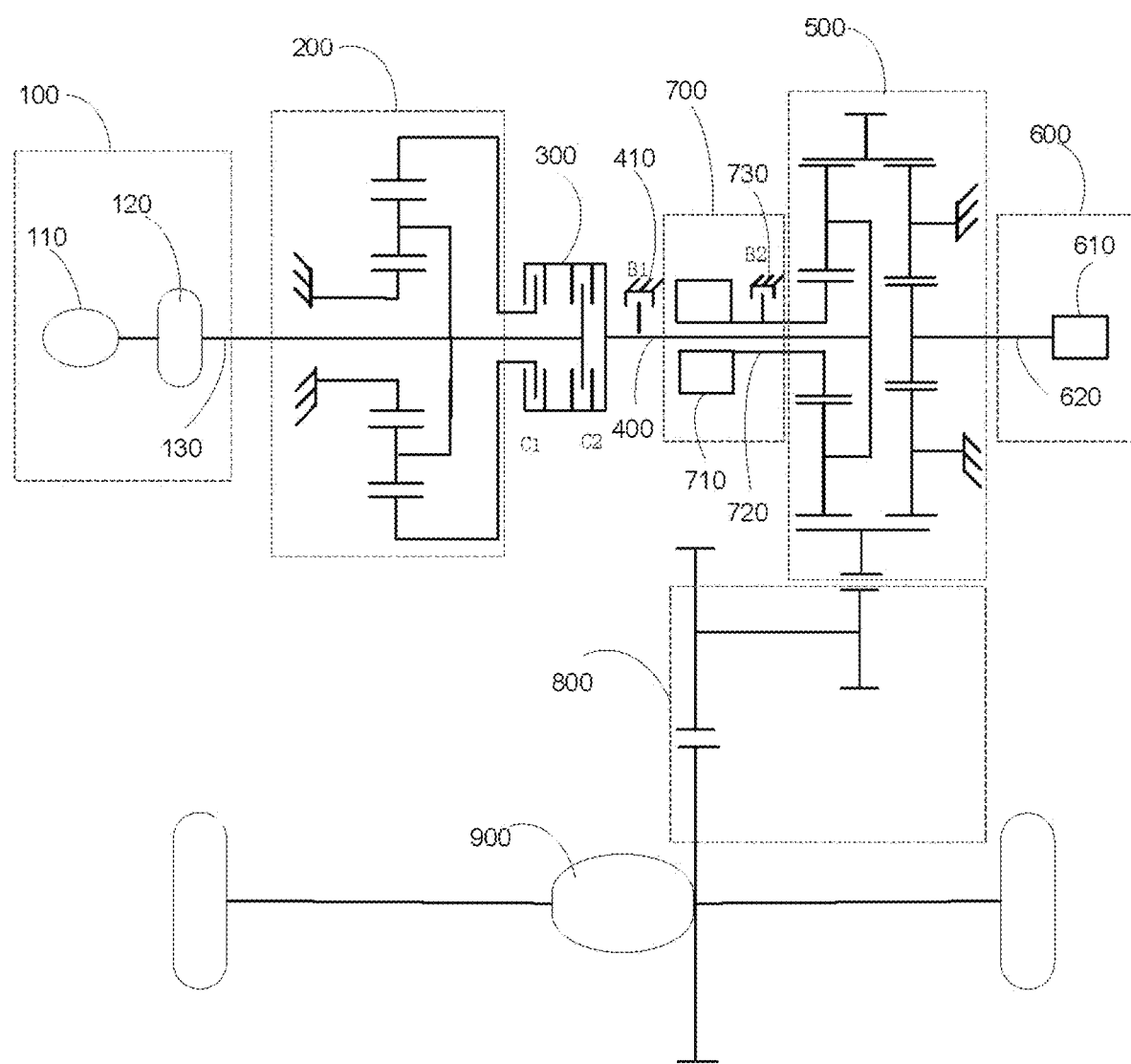
FIG. 11 is a structure block diagram of a dual row planetary hybrid coupling mechanism according to a second embodiment of the present disclosure.

As shown in FIG. 11, an embodiment of the present disclosure provides a dual row planetary hybrid coupling mechanism, which includes a fuel driven mechanism 100, a single row planetary gear mechanism 200, a dual clutch 300, an intermediate connecting shaft structure, a compound planetary gear mechanism 500, a first electric driving mechanism 700, a second electric driving mechanism 600 and a power output mechanism. By means of the single row planetary gear mechanism 200, the dual clutch 300, the intermediate connecting shaft structure and the compound planetary gear mechanism 500, the fuel driven mechanism 100, the first electric driving mechanism 700 and, the second electric driving mechanism 600 can be dynamically coupled, power is output by the power output mechanism, multiple power driving modes can be achieved, and efficiency and economy of an entire system can be improved.

Moreover, in the present embodiment, the main difference from the first embodiment is that structures of the compound planetary gear mechanism 500 and the second electric driving mechanism 600 are different. Specifically, in the present embodiment, the compound planetary gear mechanism 500 includes a second planetary carrier 510 connected to the intermediate input shaft 400, a second sun gear 520 connected to the second input shaft 720, a third sun gear 540 connected to the third input shaft 620, a second planetary gear 530 provided on the second planetary carrier 510 and meshing with the second sun gear 520, a third planetary gear 550 fixedly provided and meshing with the third sun gear 540, and a second gear ring 560 simultaneously meshing with the second planetary gear 530 and the third planetary gear 550, the second gear ring 560 is connected to the power output mechanism. That is, in the present embodiment, the second planetary gear 530 and the third planetary gear 550 are provided in parallel, and are not in meshing relationship. In addition, the second planetary carrier 510 is also only connected to the second planetary gear 530, not connected to the third planetary gear 550, and the third planetary gear 550 is fixed and cannot revolve and can only rotate on its own axis. Moreover, in the present embodiment, the second electric driving mechanism 600 only includes the driving motor 610 and the third input shaft 620, not including the third brake. In the present embodiment, the compound planetary gear mechanism may be set as a Lavina planetary gear mechanism.

Figure 12:
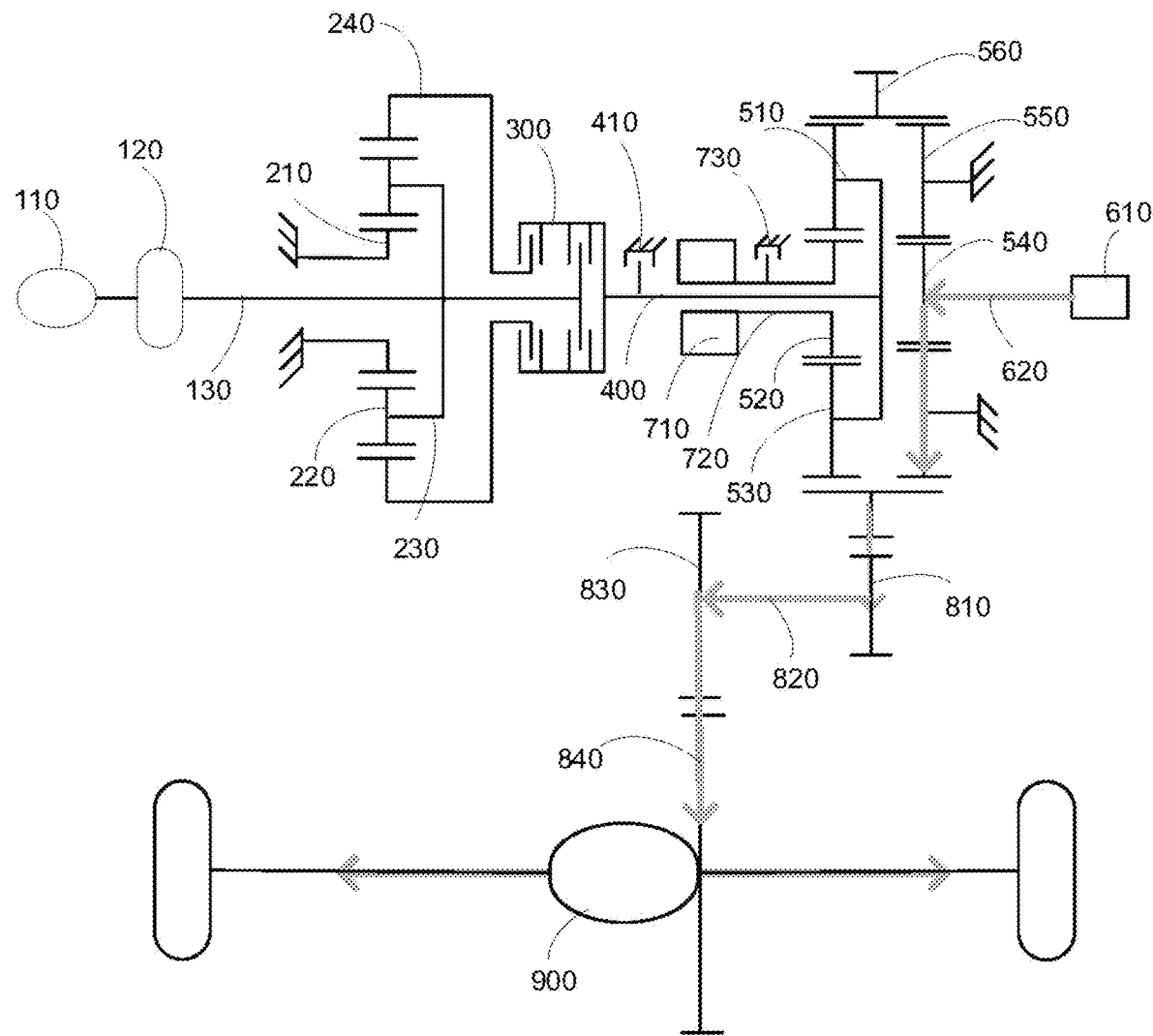
FIG. 12 is a structure block diagram of a dual row planetary hybrid coupling mechanism in a single-motor pure electric driving mode according to a second embodiment of the present disclosure.
Figure 13:
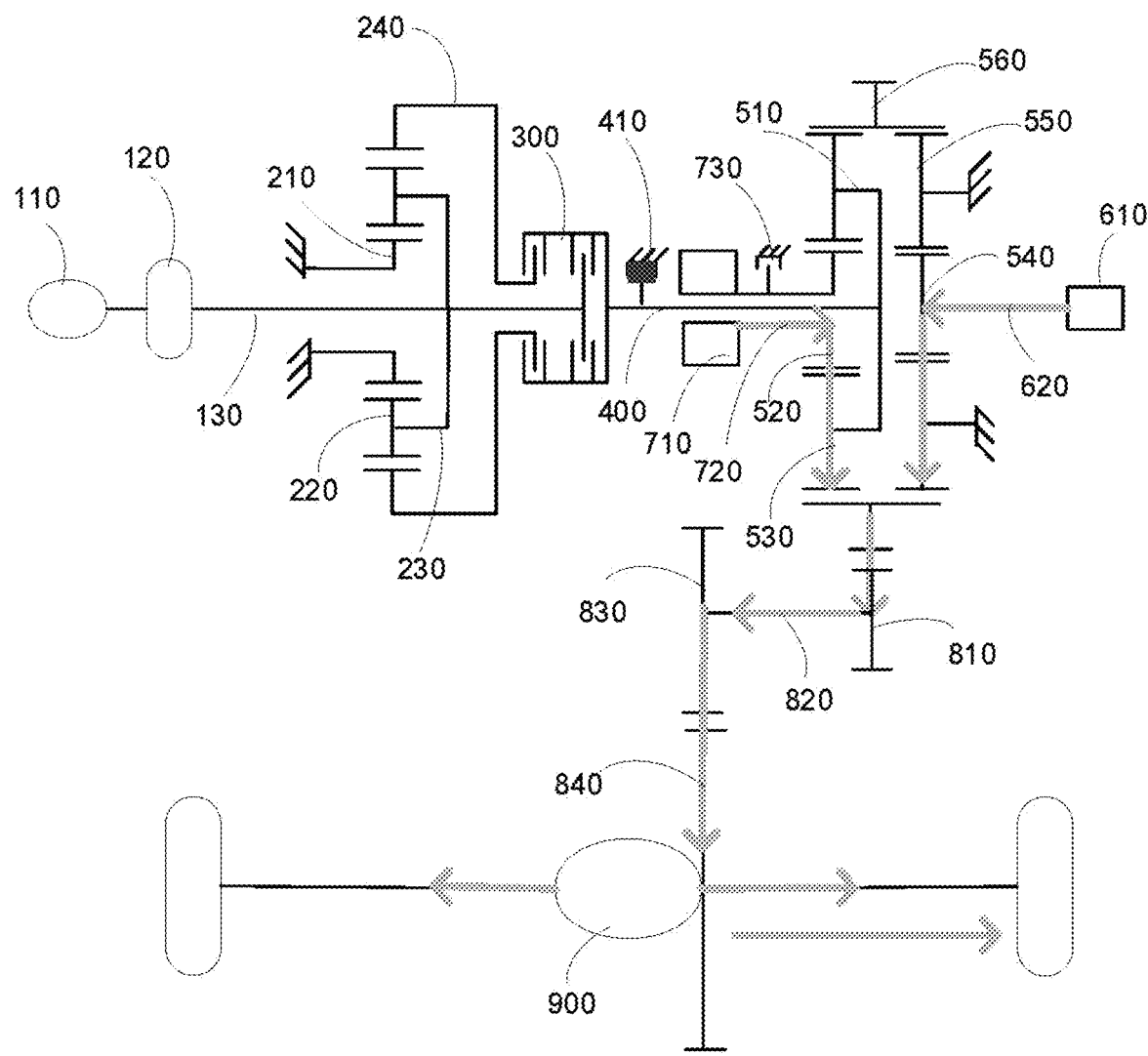
FIG. 13 is a structure block diagram of a dual row planetary hybrid coupling mechanism in a dual-motor pure electric driving mode according to a second embodiment of the present disclosure.

In addition, as shown in FIG. 12 to FIG. 13, the dual row planetary hybrid coupling mechanism has a pure electric driving mode. Similarly, in the pure electric driving mode, the first brake 410 locks the intermediate input shaft 400, so that the intermediate input shaft 400 cannot rotate, and the second planetary carrier 510 cannot rotate accordingly. At this time, power of the engine 110 cannot be transferred by the intermediate input shaft 400, and the compound planetary gear mechanism 500 is only driven by the driving motor 610 and the generator 710, thereby realizing pure electric power output.

Moreover, as shown in FIG. 12, when only the driving motor 610 works, the driving motor 610 drives the compound planetary gear mechanism 500 through the third input shaft 620, and the dual row planetary hybrid coupling mechanism achieves a single-motor electric driving mode. At this time, the principle is the same as that in the first embodiment. In addition, as shown in FIG. 13, when the driving motor 610 and the generator 710 work simultaneously, the driving motor 610 drives the compound planetary gear mechanism 500 through the third input shaft 620, and the generator 710 drives the compound planetary gear mechanism 500 through the second input shaft 720, so as to achieve a dual-motor pure electric driving mode. At this time, the driving motor 610 drives the third sun gear 540 to rotate by the third input shaft 620, and the generator 710 also drives the second sun gear 520 to rotate on its own axis by the second input shaft 720, so as to drive the second planetary gear 530 to rotate, so that the second planetary gear 530 and the third planetary gear 550 are enabled to simultaneously drive the second gear ring 560, thereby driving the power output mechanism by the second gear ring 560, so as to achieve the dual-motor pure electric driving mode.

Figure 14:
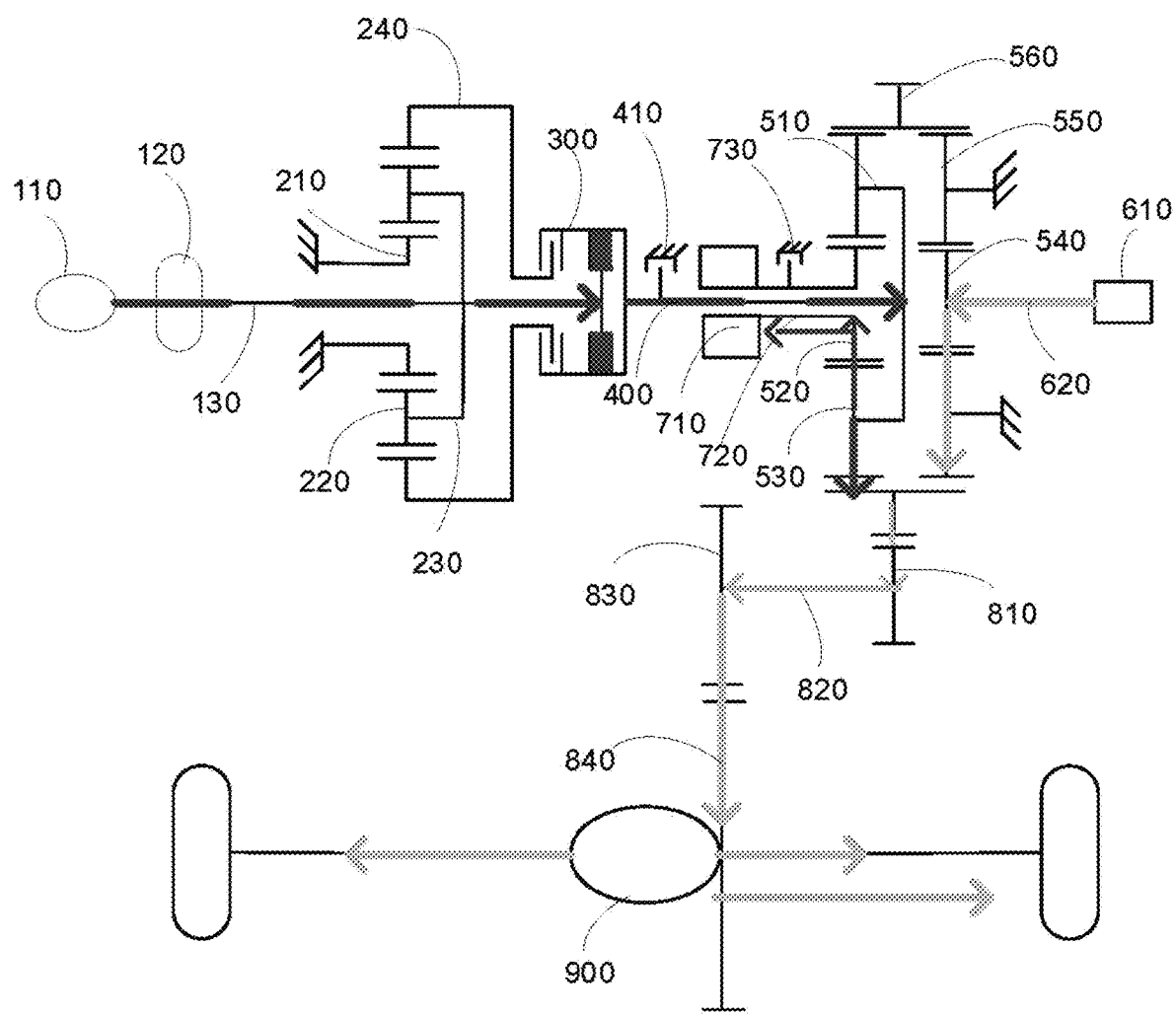
FIG. 14 is a structure block diagram of a dual row planetary hybrid coupling mechanism in a first, hybrid driving mode according to a second embodiment of the present disclosure.
Figure 15:
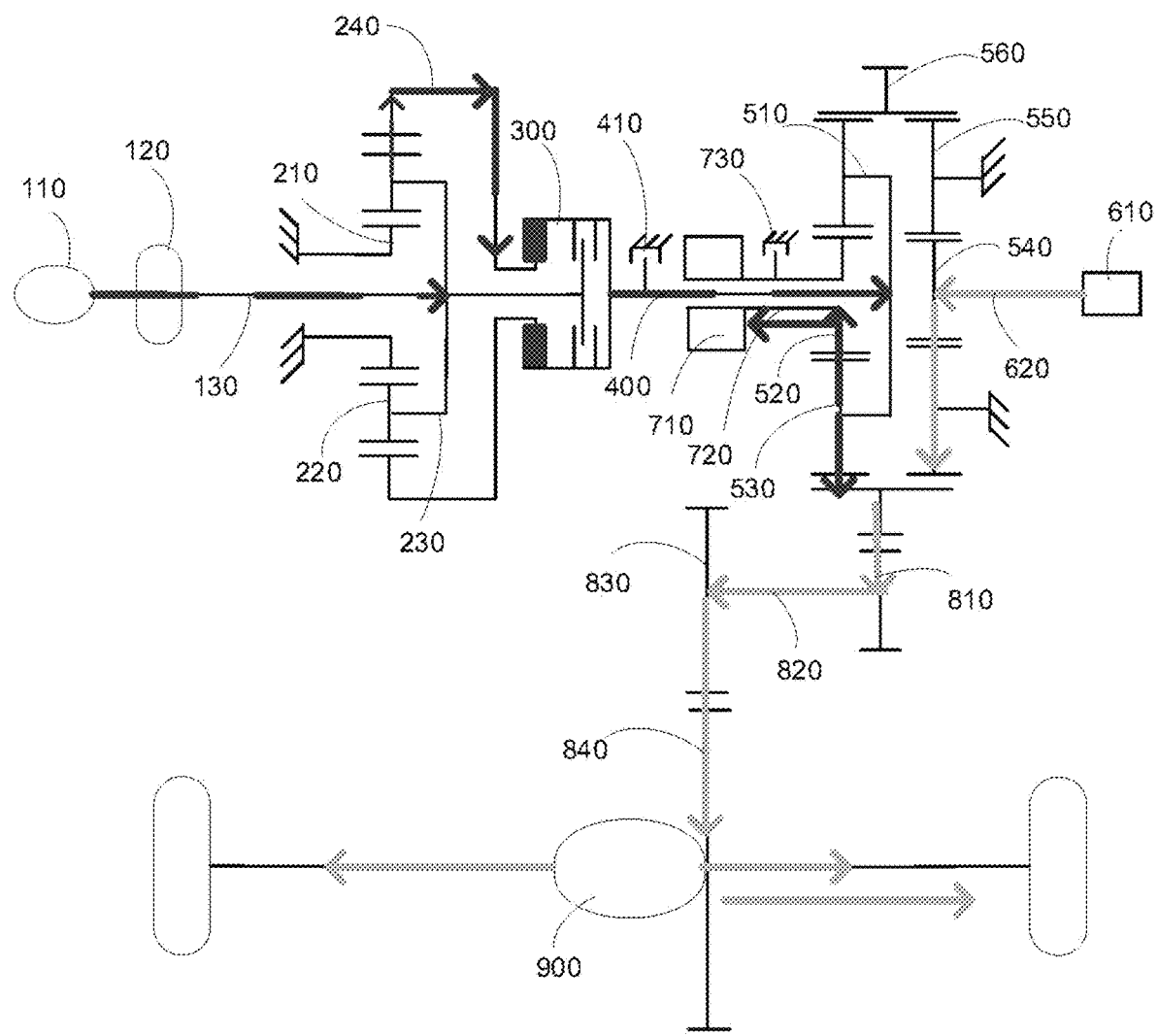
FIG. 15 is a structure block diagram of a dual row planetary hybrid coupling mechanism in a second hybrid driving mode according to a second embodiment of the present disclosure.

In addition, as shown in FIG. 14 to FIG. 15, the dual row planetary hybrid coupling mechanism has a hybrid driving mode, that is, the engine 110 and the driving motor 610 simultaneously perform a driving mode. In the hybrid driving mode, the engine 110 may drive the compound planetary gear mechanism 500, and the driving motor 610 may also drive the compound planetary gear mechanism 500. In the present embodiment, the specific principle differs from the first embodiment in that the engine 110 drives the second planetary carrier 510 of the compound planetary gear mechanism 500 through the intermediate input shaft 400 to rotate, so as to drive the second planetary gear 530 to rotate, thereby driving the second gear ring 560 to perform engine drive on the power output mechanism. Moreover, the driving motor 610 drives the second gear ring 560 to rotate through the third input shaft 620, the third sun gear 540 and the third planetary gear 550, so that the power output mechanism can be electrically driven. In addition, since the dual clutch 300 meshes with the first gear ring 240 or the first input shaft 130, the engine 110 may drive the compound planetary gear mechanism 500 through the first input shaft 130 or the single row planetary gear mechanism 200, so that the output speed ratio can be adjusted by the dual clutch 300. Similarly, in the hybrid driving mode, the generator 710 may be used to start the engine 110 and also used to generate electricity.

Figure 16:
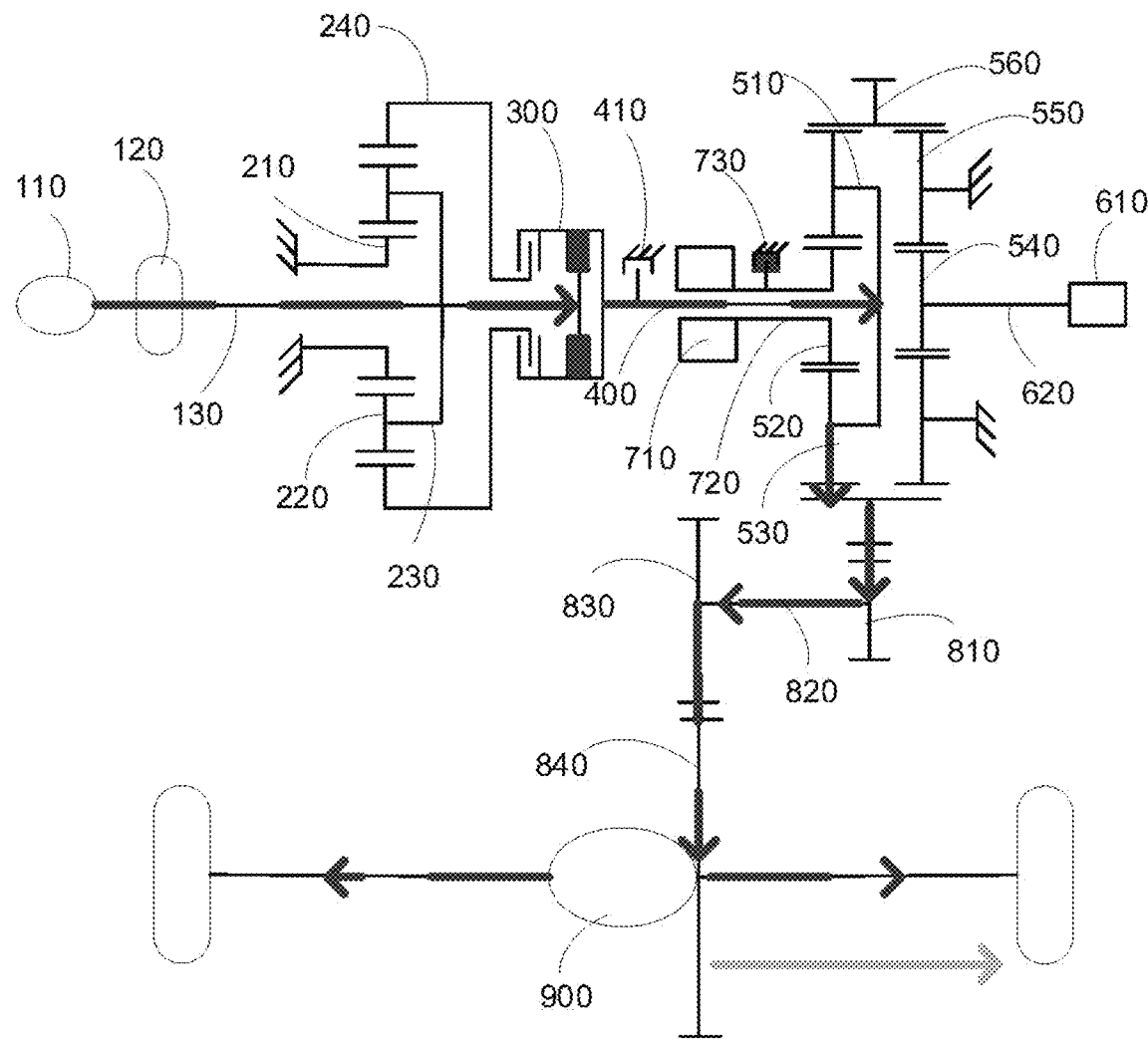
FIG. 16 is a structure block diagram of a dual row planetary hybrid coupling mechanism in an engine direct driving mode (first gear) according, to a second embodiment of the present disclosure.
Figure 17:
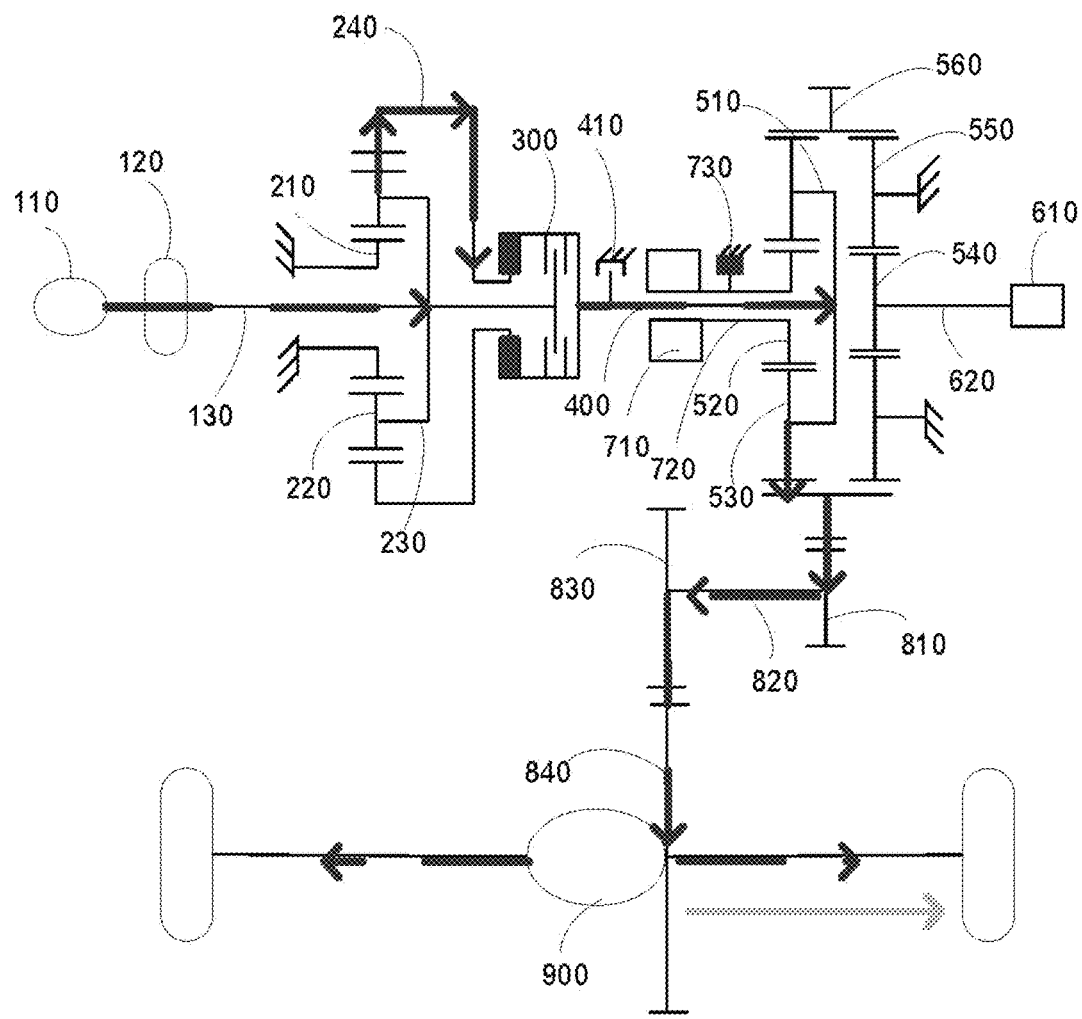
FIG. 17 is a structure block diagram of a dual row planetary hybrid coupling mechanism in an engine direct driving mode (second gear) according to a second embodiment of the present disclosure.

In addition, as shown in FIG. 16 to FIG. 17, the dual row planetary hybrid coupling mechanism has an engine direct driving mode, that is, only the engine is used to drive the power output mechanism, the generator 710 and the driving motor 610 do not output power, and the generator 710 may be used to start the engine 110. In the present embodiment, since the third brake, is not present, there is only a case, where the second input shaft 720 is locked by the second brake 730 to fix the second sun gear 520.

Moreover, similarly, when the second brake 730 locks the second input shaft 720, and when the first input shaft 130 meshes with the dual clutch 300, the first input shaft 130 directly drives the compound planetary gear mechanism 500 through the intermediate input shaft 400. At this time, a first-gear direct driving mode of the engine 110 can be achieved. Specifically, the engine 110 drives the second planetary carrier 510 of the compound planetary gear mechanism 500 through the intermediate input shaft 400 to rotate, so as to drive the second planetary gear 530 to rotate around the second sun gear 520, thereby driving the second gear ring 560 by using the second planetary gear 530 to perform engine drive on the power output mechanism. In addition, when the first gear ring 240 meshes with the dual clutch 300, the single row planetary gear mechanism 200 drives the compound planetary gear mechanism 500 through the intermediate input shaft 400. At this time, a second-gear direct driving mode of the engine 110 can be achieved. The specific principle is as above. In this way, two-gear speed ratio of the engine can be adjusted by the single row planetary gear mechanism 200 and the compound planetary gear mechanism 500, the system modes are diverse, the efficiency is high, and the economy is good.

In addition, the dual row planetary hybrid coupling mechanism further includes a power battery connected to the generator 710 and the driving motor 720, wherein the dual row, planetary hybrid coupling mechanism may automatically achieve switching of various driving modes according to an SOC (State of Charge, also called battery remaining capacity) value of the power battery and a required output speed value. The specific process is basically the same as that in the first embodiment, except that the third brake is not provided in the present embodiment, so that in the hybrid driving mode, only two gears are adjustable.

Figure 18:
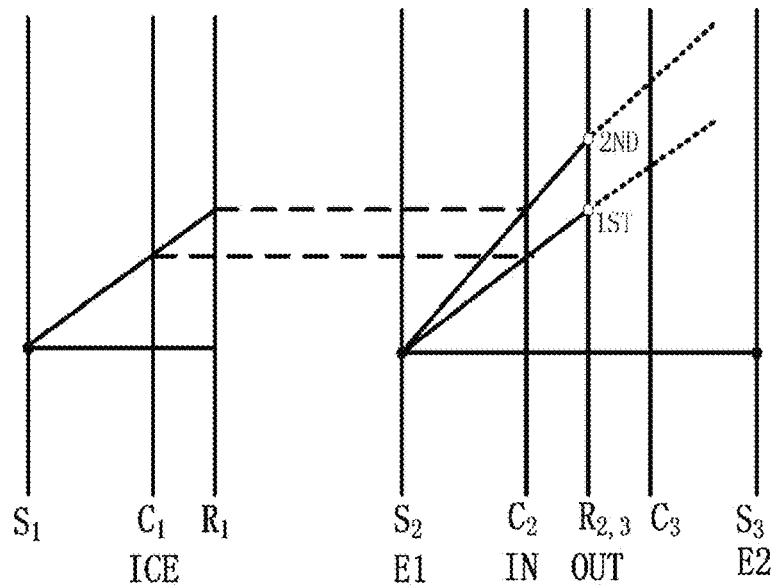
FIG. 18 is a lever diagram of a dual row planetary hybrid coupling mechanism according to a second embodiment of the present disclosure.

Moreover, as shown in FIG. 18, the above three types of power-coupled driving modes are as follows in Table 2 below:

TABLE 2

| | Execution component | | | | | | | Use condition | |
|---|---|---|---|---|---|---|---|---|---|
| Mode | Engine | Generator | Driving motor | C1 | C2 | B1 | B2 | SOC | Speed |
| Single-motor pure electric | / | / | Drive | | | | | High | Full speed |
| Dual-motor pure electric | / | Drive | Drive | | | | ✓ | High | Full speed |
| Hybrid driving mode 1 (E-CVT1) | Drive | Power generation, engine start | Auxiliary drive | ✓ | | | | / | Medium-low speed |
| Hybrid driving mode 2 (E-CVT2) | Drive | Power generation, engine start | Auxiliary drive | | ✓ | | | / | Medium-low speed |
| Engine direct drive (first gear) | Drive | Engine start | / | | | ✓ | ✓ | / | Medium-low speed |
| Engine direct drive (second gear) | Drive | Engine start | / | | ✓ | | ✓ | / | Medium-high speed |

Wherein, C1 indicates that the first input shaft 130 meshes with the dual clutch 300, and C2 indicates that the first gear ring 240 meshes with the dual clutch 300. B1 indicates the first brake 410, and B2 indicates the second brake 730.

When the SOC value is high and the required output speed is a full speed, B1 can be brake to start the pure electric driving mode. Moreover, a single-motor pure electric driving mode may be started specifically, and the compound planetary gear mechanism 500 may be driven by the driving motor 610; in addition, a dual-motor pure electric driving mode may be started, B1 can be selected for braking, and the compound planetary gear mechanism 500 may be driven by the generator 710 and the driving motor 610 simultaneously.

When the required output speed is a medium-low speed, a hybrid driving mode (E-CVT) can be started. Moreover, by selecting C1 or C2, the hybrid driving mode 1 or the hybrid driving mode 2 can be achieved. In this case, the engine 110 is used as a main power to drive the compound planetary gear mechanism 500, and the drive motor 610 is used as an auxiliary power to drive the compound planetary gear mechanism 500. Moreover, in the process, the generator 710 can be used to start the engine 110, and the generator 710 can also be used to generate electricity.

In addition, when the required output speed is a medium-low speed, or a medium-high speed, an engine direct driving mode can also be started. Specifically, C1 or C2 can, be selected and B2 can be selected for braking, first-gear direct drive or second-gear direct drive of the engine can be achieved. In this process, the generator 710 can be used to start the engine 110.

In addition, some embodiments of the present disclosure also provide a motor vehicle, including the dual row planetary hybrid coupling mechanism described in the above two embodiments. By providing the dual row planetary hybrid coupling mechanism, an engine and a generator of a system are connected by a planetary gear mechanism (i.e., the single row planetary gear mechanism and the compound planetary gear mechanism), the output speed ratio can be adjusted by changing the meshing situation of the engine and the generator with the single row planetary gear mechanism and the compound planetary gear mechanism through a brake and a clutch, the speed ratio range is large, and a rotate speed of the generator is higher than a rotate speed of the engine, so that the torque demand of the generator is reduced, and the volume of the generator can be reduced. Moreover, in a hybrid driving mode, the speed can be adjusted by adjusting the meshing situation of the single row planetary, gear mechanism and the compound planetary gear mechanism, working range of the engine is optimized, and economic performance of the engine is improved. In addition, a driving motor is connected for output through the planetary gear mechanism (i.e., the compound planetary gear mechanism), which can increase the speed ratio of the driving motor, and facilitate the high speed of the motor, thereby reducing a size of the motor, and facilitating space saving and weight reduction. In addition, during the switching process of various driving modes, the driving motor participates in the drive, and there is no power interruption. In addition, two pure electric driving modes, two hybrid driving modes and two (or four) engine direct driving modes can be achieved, thereby realizing many system modes and good economy.

In addition, it is also, to be understood that in some embodiments of the present disclosure, the positional relationship indicated by the terms "lower", "upper", "front", "back", "left", "right", "inside", "outside", "top", "bottom", "one side", "the other side", "one end", "the other end", etc. is based on the positional relationship shown in the drawings; the terms "first", "second", and "third" are used to distinguish different structural components. These terms are only for the purpose of describing the embodiments of the present disclosure and simplifying the description, and are not to be construed as limiting the embodiments of the present disclosure.

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of, several implementation manners of the embodiments of the present disclosure with specific and detailed description, and are not to be construed as limiting the patent scope of the embodiments of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A dual row planetary hybrid coupling mechanism, comprising a fuel driven mechanism, a single row planetary gear mechanism, a dual clutch, an intermediate connecting shaft structure, a compound planetary gear mechanism, a first electric driving mechanism, a second electric driving mechanism and a power output mechanism, wherein the fuel driven mechanism comprises an engine, and a first input shaft connected to the engine;

the single row planetary gear mechanism comprises a first sun gear fixedly arranged, a first planetary carrier provided on the first input shaft, a first planetary gear provided on the first planetary carrier and meshing with the first sun gear, and a first gear ring meshing with the first planetary gear, and the dual clutch corresponds to the first gear ring and the first input shaft respectively;

the intermediate connecting shaft structure comprises an intermediate input shaft connected to the dual clutch, and a first brake corresponding to the intermediate input shaft;

the first electric driving mechanism comprises a generator, a second input shaft connected to the generator, and a second brake corresponding to the second input shaft;

the second electric driving mechanism comprises a driving motor, and a third input shaft connected to the driving motor; and, the intermediate input shaft, the second input shaft and the third input shaft are connected to the compound planetary gear mechanism, and the compound planetary gear mechanism is connected to the power output mechanism;

wherein the compound planetary gear mechanism comprises a second planetary carrier connected to the intermediate input shaft, a second sun gear connected to the second input shaft, a third sun gear connected to the third input shaft, a second planetary gear and a third planetary gear provided on the second planetary carrier, and a second gear ring meshing with the third planetary gear; and the second electric driving mechanism further comprises a third brake corresponding to the third input shaft, the second planetary gear meshes with the second sun gear, the third planetary gear meshes with the third sun gear, the second planetary gear meshes with the third planetary gear, and the second gear ring is connected to the power output mechanism; or wherein the compound planetary gear mechanism comprises a second planetary carrier connected to the intermediate input shaft, a second sun gear connected to the second input shaft, a third sun gear connected to the third input shaft, a second planetary gear provided on the second planetary carrier and meshing with the second sun gear, a third planetary gear fixedly arranged and meshing with the third sun gear, and a second gear ring simultaneously meshing with the second planetary gear and the third planetary gear, the second gear ring being connected to the power output mechanism.

2. The dual row planetary hybrid coupling mechanism as claimed in claim 1, wherein the dual row planetary hybrid coupling mechanism has a pure electric driving mode, and in the pure electric driving mode, the first brake locks the intermediate input shaft; and when the driving motor drives the compound planetary gear mechanism through the third input shaft, a single-motor electric driving mode is achieved, and when the driving motor drives the compound planetary gear mechanism through the third input shaft and the generator drives the compound planetary gear mechanism through the second input shaft simultaneously, a dual-motor pure electric driving mode is achieved.

3. The dual row planetary hybrid coupling mechanism as claimed in claim 1, wherein the dual row planetary hybrid coupling mechanism has an engine direct driving mode, and in the engine direct driving mode, the second brake locks the second input shaft; and when the first input shaft meshes with the dual clutch, the first input shaft directly drives the compound planetary gear mechanism through the intermediate input shaft, and when the first gear ring meshes with the dual clutch, the single row planetary gear mechanism drives the compound planetary gear mechanism through the intermediate input shaft.

4. The dual row planetary hybrid coupling mechanism as claimed in claim 1, wherein the dual row planetary hybrid coupling mechanism has an engine direct driving mode, and in the engine direct driving mode, the third brake locks the third input shaft; and when the first input shaft meshes with the dual clutch, the first input shaft directly drives the compound planetary gear mechanism through the intermediate input shaft, and when the first gear ring meshes with the dual clutch the single row planetary gear mechanism drives the compound planetary gear mechanism through the intermediate input shaft.

5. The dual row planetary hybrid coupling mechanism as claimed in claim 1, wherein the dual row planetary hybrid coupling mechanism has a hybrid driving mode, in the hybrid driving mode, the engine drives the compound planetary gear mechanism through the first input shaft or the single row planetary gear mechanism, and the driving motor drives the compound planetary gear mechanism through the third input shaft.

6. The dual row planetary hybrid coupling mechanism as claimed in claim 1, further comprising a power battery connected to the generator and the driving motor, where in the dual row planetary hybrid coupling mechanism automatically achieves switching of various driving modes according to a State of Charge (SOC) value of the power battery and a required output speed value.

7. The dual row planetary hybrid coupling mechanism as claimed in claim 6, wherein the dual row planetary hybrid coupling mechanism determines a magnitude relationship between the SOC value of the power battery and a first threshold, or simultaneously determines a magnitude relationship between the SOC value of the power battery and a first threshold and a magnitude relationship between the required output speed value and a second threshold; and switches a driving mode of the dual row planetary hybrid coupling mechanism according to a determination result.

8. A motor vehicle, comprising the dual row planetary hybrid coupling mechanism as claimed in claim 1.

9. The dual row planetary hybrid coupling mechanism as claimed in claim 1, further comprising a power battery connected to the generator and the driving motor, wherein the dual row planetary hybrid coupling mechanism automatically achieves switching of various driving modes according to a State of Charge (SOC) value of the power battery and a required output speed value.

10. The dual row planetary hybrid coupling mechanism as claimed in claim 1, further comprising a power battery connected to the generator and the driving motor, wherein the dual row planetary hybrid coupling mechanism automatically achieves switching of various driving modes according to a State of Charge (SOC) value of the power battery and a required output speed value.

* * * * *